United States Patent [19]

Yonekubo et al.

[11] Patent Number: 5,456,588
[45] Date of Patent: Oct. 10, 1995

[54] INJECTION MOLD DEVICE

[75] Inventors: Hiroshi Yonekubo, Kamiina; Kaoru Maeda, Hachiohji; Tetsuo Suga, Ina; Kazuo Saito, Tatsunomachi; Shoso Nishida, Hiroshima, all of Japan

[73] Assignee: Olympus Optical Co. Ltd., Tokyo, Japan

[21] Appl. No.: 76,915

[22] Filed: Jun. 15, 1993

[30] Foreign Application Priority Data

| Jun. 15, 1992 | [JP] | Japan | 4-180359 |
| Oct. 7, 1992 | [JP] | Japan | 4-293911 |
| May 14, 1993 | [JP] | Japan | 5-136444 |

[51] Int. Cl.$^6$ ................................ B29C 45/10
[52] U.S. Cl. .............. 425/183; 425/185; 425/190; 425/575; 425/595
[58] Field of Search ................... 425/150, 183, 425/185, 190, 192 R, 195, 575, 589, 595

[56] References Cited

U.S. PATENT DOCUMENTS

| 3,898,030 | 8/1975 | Bishop | 425/183 |
| 3,982,869 | 9/1976 | Eggers | 425/575 |
| 4,348,165 | 9/1982 | Vostrovsky | 425/192 R |
| 4,379,685 | 4/1983 | Tada et al. | 425/183 |
| 4,550,006 | 10/1985 | Laghi | 425/183 |
| 4,708,633 | 11/1987 | Hayashi et al. | 425/575 |
| 4,810,181 | 3/1989 | Ozawa | 425/575 |

*Primary Examiner*—James P. Mackey
*Attorney, Agent, or Firm*—Ostrolenk, Faber, Gerb & Soffen

[57] ABSTRACT

An injection mold device comprises a first matrix attached to a movable platen and a second matrix attached to a fixed platen. A multiplicity of first cavity units are attached to the first matrix. A multiplicity of second cavity units are provided for selective removable attachment to the first matrix during a mold-clamping state and to the second matrix during a mold-opening state. A self-holding device is associated with the first matrix for maintaining a clamping force between the first cavity units and the second cavity units during the mold-clamping state. A mold-opening device is associated with the second matrix for removably attaching the second cavity units to the first matrix in the mold-clamping state and for removing the second cavity units from the first matrix in the mold-opening state.

30 Claims, 23 Drawing Sheets

INJECTION MOLD DEVICE

BACKGROUND OF THE INVENTION

1. Field of the Invention

The present invention relates to an injection mold device for injecting a molten resin thereinto and molding it into a thick-walled product with high accuracy.

2. Description of the Related Art

In the case of producing a thick-walled part, such as a plastic lens, by injection molding, a cooling process is necessary for the purpose of preventing shrinkage or deformation, which inconveniently prolongs the molding cycle time. As a method of molding a thick-walled part in a short molding cycle time without causing shrinkage or deformation, an injection molding method disclosed in Japanese Patent Laid-Open No. 64-36421 is known. In this injection molding method, after a pair of mold pieces removably provided on templates on the movable side and the fixed side is clamped together by an injection molding machine, the pair of mold pieces is clamped together by a U-shaped mold clamping member and then heated to a temperature above the glass transition temperature of the resin. After injecting a molten resin into the mold, the gate is closed so as to gradually cool the mold to the thermal transformation temperature, and the mold-clamping member is removed from the injection molding machine while the pair of mold members is held in the mold-clamped state. The mold is moved to a place outside of the injection molding machine to be cooled. During this time, other mold pieces are manually set on each template of the molding machine, a molten resin is injected and then gradually cooled in the same way as described above. The mold pieces are then manually removed from the mold-clamping member and manually moved to the outside of the molding machine to be cooled. By this method, the molding cycle is repeated by using a plurality of molds. In the above-described conventional molding method, however, it is necessary to remove the mold from the mold-clamping member in the cooling process and to set another mold in the molding machine during the cooling process. The manual movement, setting and removal of a mold are troublesome, and the change-over of molds is inconvenient and time consuming.

SUMMARY OF THE INVENTION

Accordingly, it is an object of the present invention to eliminate the above-described problems in the related art and to provide an injection mold device which obviates the manual movement, setting and removal of a mold and which can shorten the time taken for changing molds.

To achieve this aim, in an injection mold device according to the present invention, engaging means are provided on a pair of cavity units which forms a cavity and the matrixes to which the respective cavity units are attached, and the self-maintenance and the release of the mold-clamping force by the engaging means are linked with the mold clamping operation and the mold opening operation, respectively.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
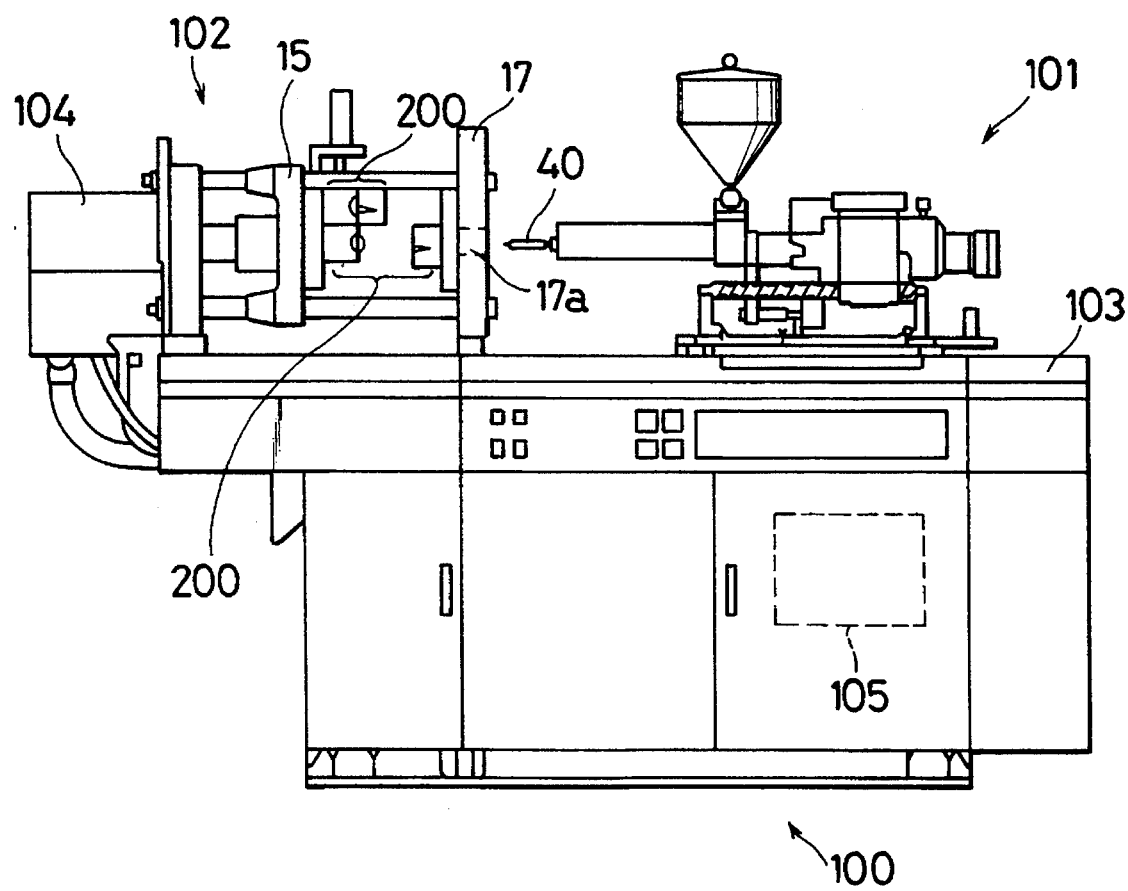
FIG. 1 is a side elevational view of an injection molding machine on which an injection mold device according to the present invention is mounted.

FIG. 1 shows the entire structure of an injection molding machine 100 on which an injection mold device according to the present invention is mounted. On the main body 103 of the injection molding machine 100 are provided an injection apparatus 101 for melting a resin and injecting the molten resin from a nozzle 40 at the end of the injection apparatus 101, and a mold clamping apparatus 102 for opening and clamping the mold. A controller 105 for controlling the operations of the injection apparatus 101 and the mold-clamping apparatus 102 is provided within the main body 103. The mold clamping apparatus 102 is provided with a driving portion 104 attached to the left-hand end of the main body 103, a movable platen 15 attached to the driving portion 104 so as to reciprocate on the main body in the mold clamping direction, and a fixed platen 17 fixed to the main body 103 so as to face the movable platen 15. A mold 200 (a pair of cavity units) for molding the injected resin is attached to the opposing surfaces of the movable platen 15 and the fixed platen 17. A clearance hole 17a through which the nozzle 40 of the injection apparatus 101 penetrates is formed in the fixed platen 17. The injection apparatus 101 moves on the main body 103 so as to penetrate through the clearance hole 17a and reach the cavity units 200.

Figure 2:
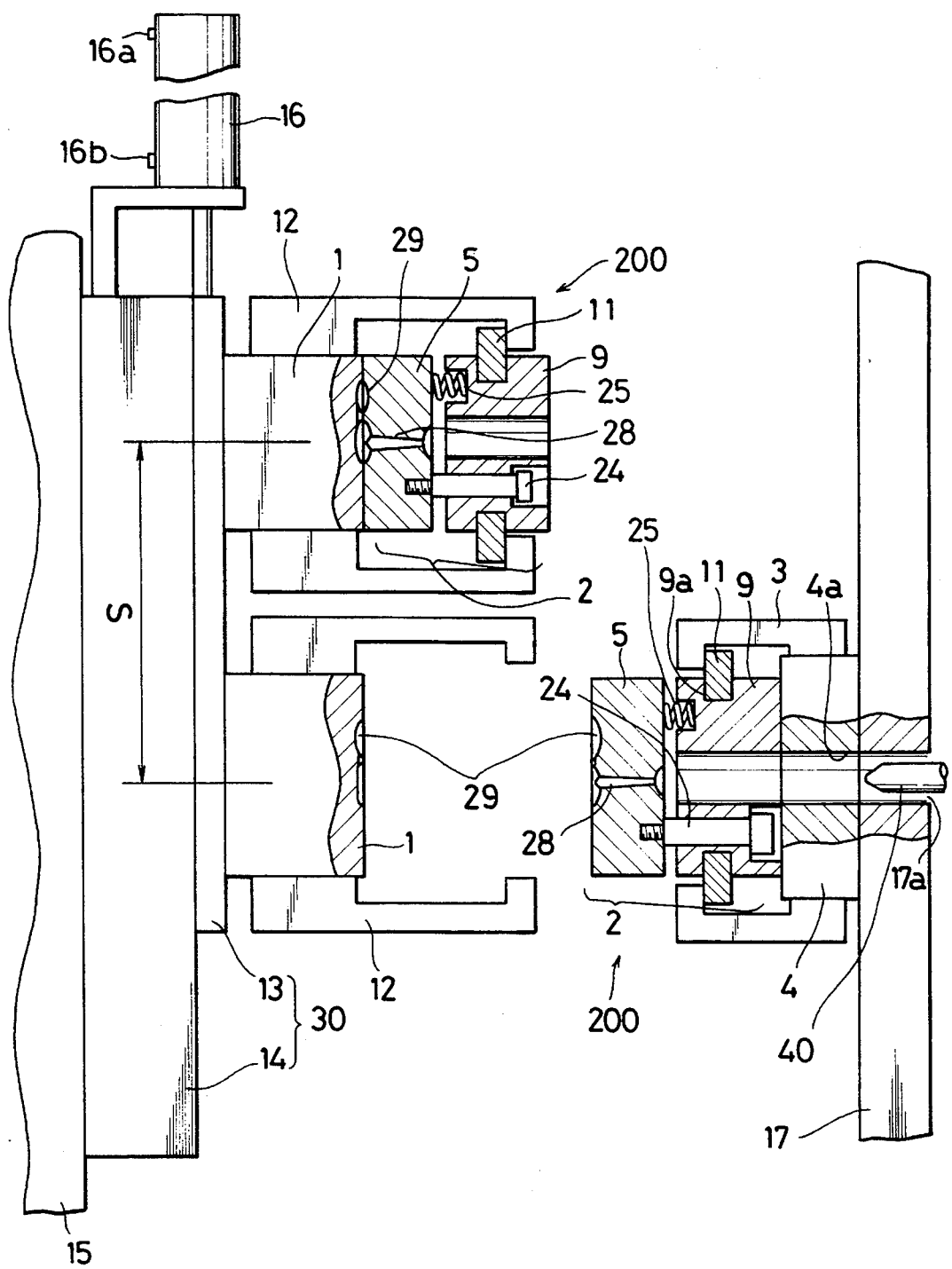
FIG. 2 is a side elevational view of a first embodiment of an injection mold device according to the present invention.
Figure 3:
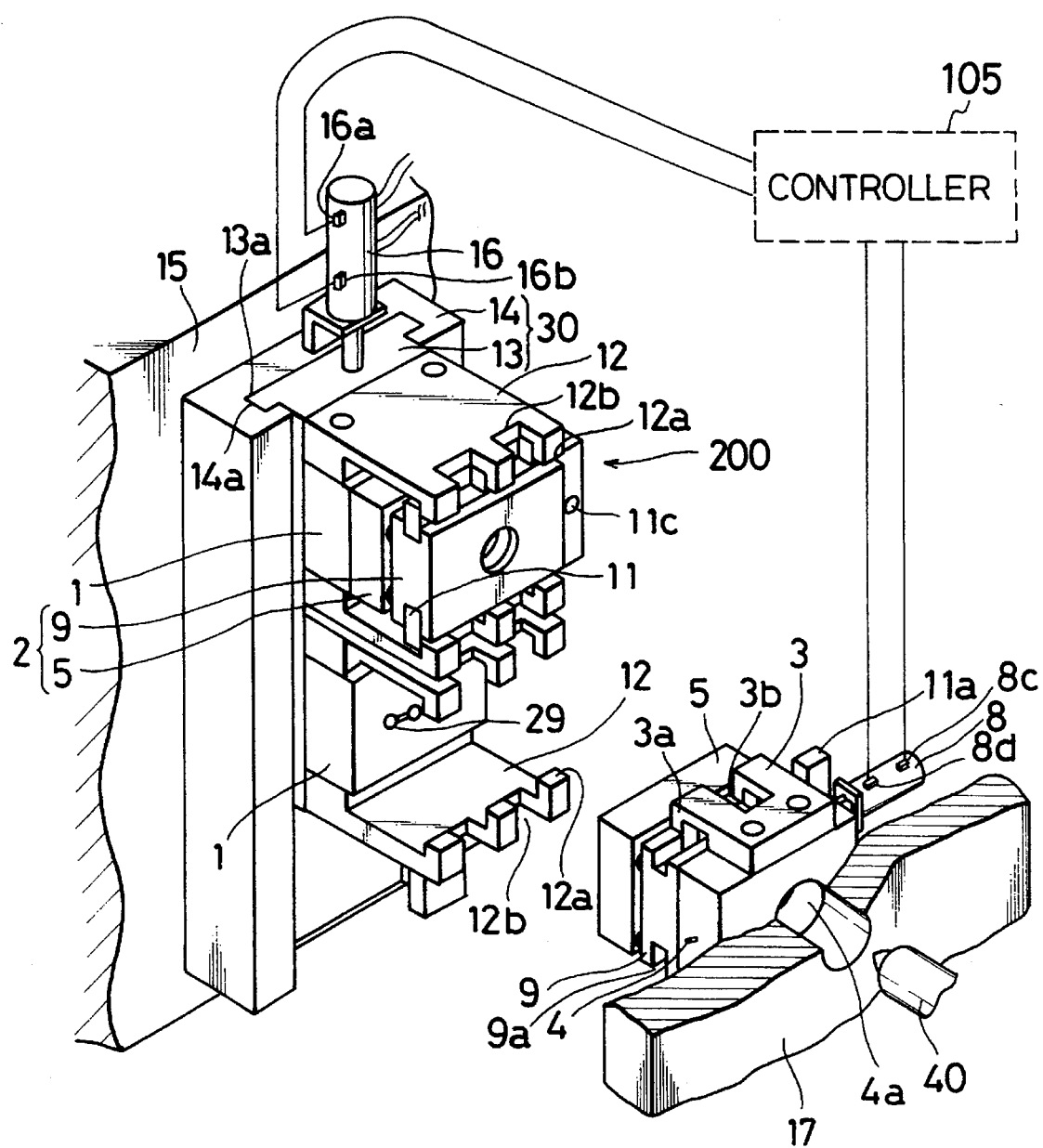
FIG. 3 is a perspective view of the first embodiment shown in FIG. 2.

FIGS. 2 and 3 show the cavity units 200 of a first embodiment of the present invention in the mounted state. A matrix 30 is composed of a mounting plate 14 and a sliding plate 13 which is slidably attached to the mounting plate 14. Two pairs of cavity units 200 are provided on the front surface of the sliding plate 13 in parallel with each other in the vertical direction which is orthogonal to the direction of mold clamping. Projecting portions 13a of the sliding plate 13 are inserted into a dovetail groove 14a formed on the mounting plate 14 in the vertical direction. The sliding plate 13 is connected to an actuator 16 which is attached to the mounting plate 14, so that the sliding plate 13 slides in a vertical direction orthogonal to the direction of mold clamping. By this sliding operation, two pairs of cavity units 200 are moved between an injection position and a cooling position. The actuator 16 is provided with detection switches 16a, 16b which are connected to the controller 105 so that the controller 105 controls the amount of sliding movement of the sliding plate 13 on the basis of on/off of switching detection switches 16a, 16b.

Figure 6:
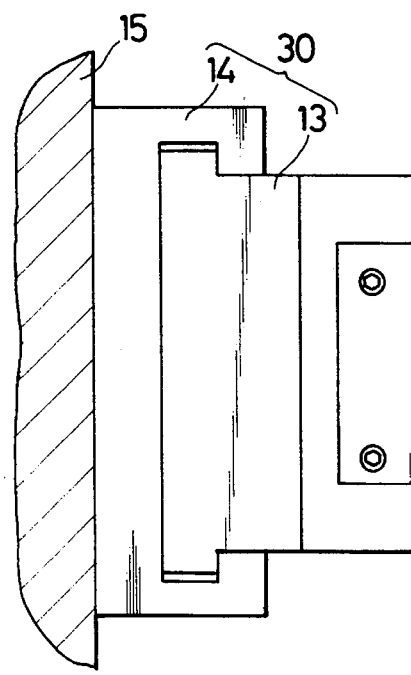
FIG. 6 is a bottom view of a removable cavity unit of the first embodiment in the mold-opened state.
Figure 7:
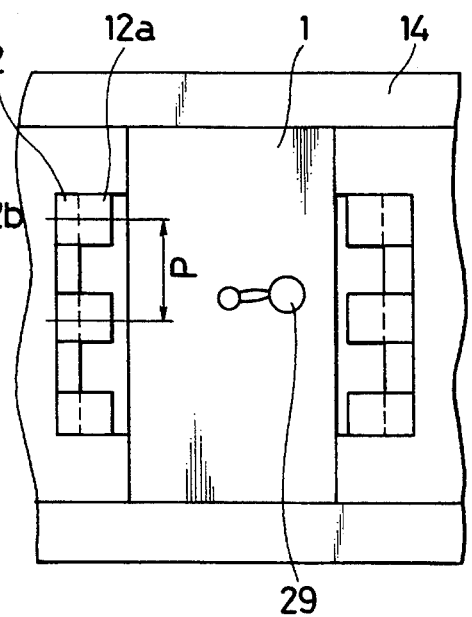
FIG. 7 shows the removable cavity unit shown in FIG. 6, seen from the right-hand side in the drawing.

Stationary cavity units 1 of the two pairs of cavity units 200 are fixed to the front surface of the sliding plate 13 in parallel with each other in the vertical direction at a pitch S, and a hooking member 12 for maintaining the mold-clamping force is attached to each stationary cavity unit 1. The hooking member 12 extends from the stationary cavity unit 1 in the direction of mold clamping. At the extended end portion of the hooking member 12, a plurality of (three in FIG. 3) hooking pieces 12a which are bent inward are provided with a slit 12b between two adjacent pieces. The hooking pieces 12a are formed at a predetermined pitch P, as shown in FIGS. 6 and 7.

A fixed matrix 4 is attached to the fixed platen 17. A removable cavity unit 2 is removably attached to the fixed matrix 4. The removable cavity unit 2 is provided with a mounting plate 9 and a template 5 attached thereto. By bringing the template 5 into close contact with the stationary cavity unit 1, a molding cavity 29 is formed. Since a molten resin is poured into the cavity 29, a resin passage 28 which communicates with the cavity 29 is formed in the template 5, and a clearance hole 4a which communicates with the clearance hole 17a of the fixed platen 17 is formed in the fixed matrix 4.

A spring 25 as an elastic member is inserted between the template 5 and the mounting plate 9. The spring 25 urges the template 5 toward the stationary cavity unit 1 so that they are brought into close contact with each other. The mold-clamping force is maintained by the spring 25. Since the spring 25 urges the template 5 toward the stationary cavity unit 1, a gap is formed between the template 5 and the mounting plate 9. However, the amount of movement of the template 5 is regulated by a stop pin 24 which is screwed into the template 5 and slidably inserted into the mounting plate 9.

A hooking member 3 for opening the mold is attached to the upper and the lower surfaces of the fixed matrix 4 by a bolt or the like. The hooking member 3 extends from the fixed matrix 4 in the direction of mold clamping. At the extended end portion of the hooking member 3, a plurality of hooking pieces 3a which are bent inward are provided with a slit 3b between two adjacent pieces. The hooking pieces 3a are formed at the same pitch P as the hooking pieces 12a on the hooking member 12.

Figure 4:
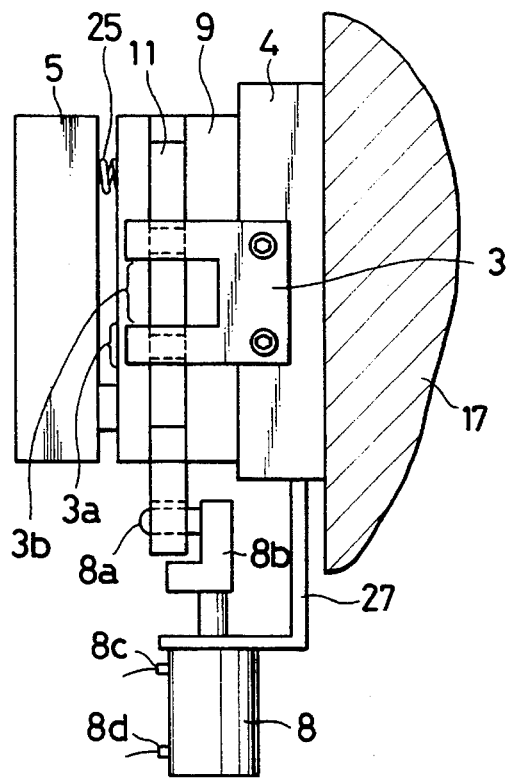
FIG. 4 is a bottom view of a stationary cavity unit of the first embodiment in the mold-opened state.

A locking member 11 is provided on the mounting plate 9 of each removable cavity unit 2. The locking member 11 is in the shape of the letter "U" and is slidable in a horizontal direction orthogonal to the direction of mold clamping. A guide groove 9a for guiding the sliding movement of the locking member 11 is formed in the upper and the lower surfaces of the mounting plate 9. The locking member 11 is provided with a plurality of (three in FIG. 5) projections 11a which project to the outside of the guide groove 9a at the pitch P with a recess 11b between two adjacent projections 11a. The projections 11a of the locking member 11 alternately engage with the hooking member 12 and the hooking member 3. In order to slide the locking member 11, an actuator 8 is provided. The actuator 8 is attached to one end surface of the fixed matrix 4 through an angle member 27. A connecting pin 8a is attached to the end portion of a rod 8b of the actuator 8. The connecting pin 8a extends from the end portion of the rod 8b toward the movable platen 15, as shown in FIG. 4. A connection hole 11c into which the connecting pin 8a is removably inserted is formed in the locking member 11 at the opposite position of the connecting pin 8a. The actuator 8 slides the locking member 11 in the direction orthogonal to the direction of mold clamping by the extension or contraction of the rod 8b, and the controller 105 controls the stroke of slide to be half of that of the pitch P. The reference numerals 8c and 8d denote detection switches provided on the actuator 8 for the purpose of controlling the stroke by the controller 105.

Figure 5:
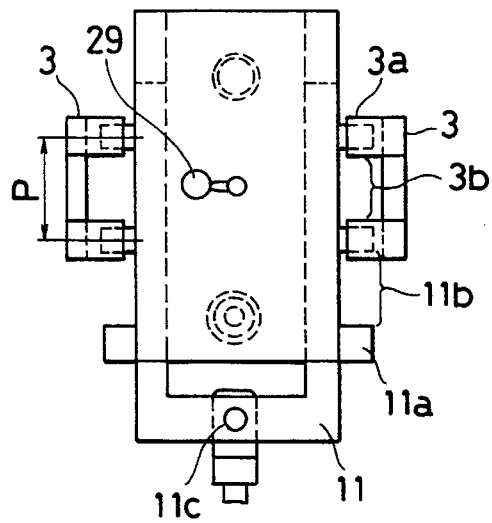
FIG. 5 shows the stationary cavity unit shown in FIG. 4, seen from the left-hand side of the drawing.

The operation of the first embodiment will now be explained. In FIGS. 2 and 3, the upper pair of cavity units 200 is in a state of maintaining a mold-clamping force, while the lower pair of cavity units 200 is in an open state. During the open state of the lower pair of cavity units 200, the hooking pieces 3a of the hooking member 3 engage with the projections 11a of the locking member 11, whereby the template 5 and the mounting plate 9 are held by the fixed matrix 4, as shown in FIGS. 4 and 5.

Figure 8:
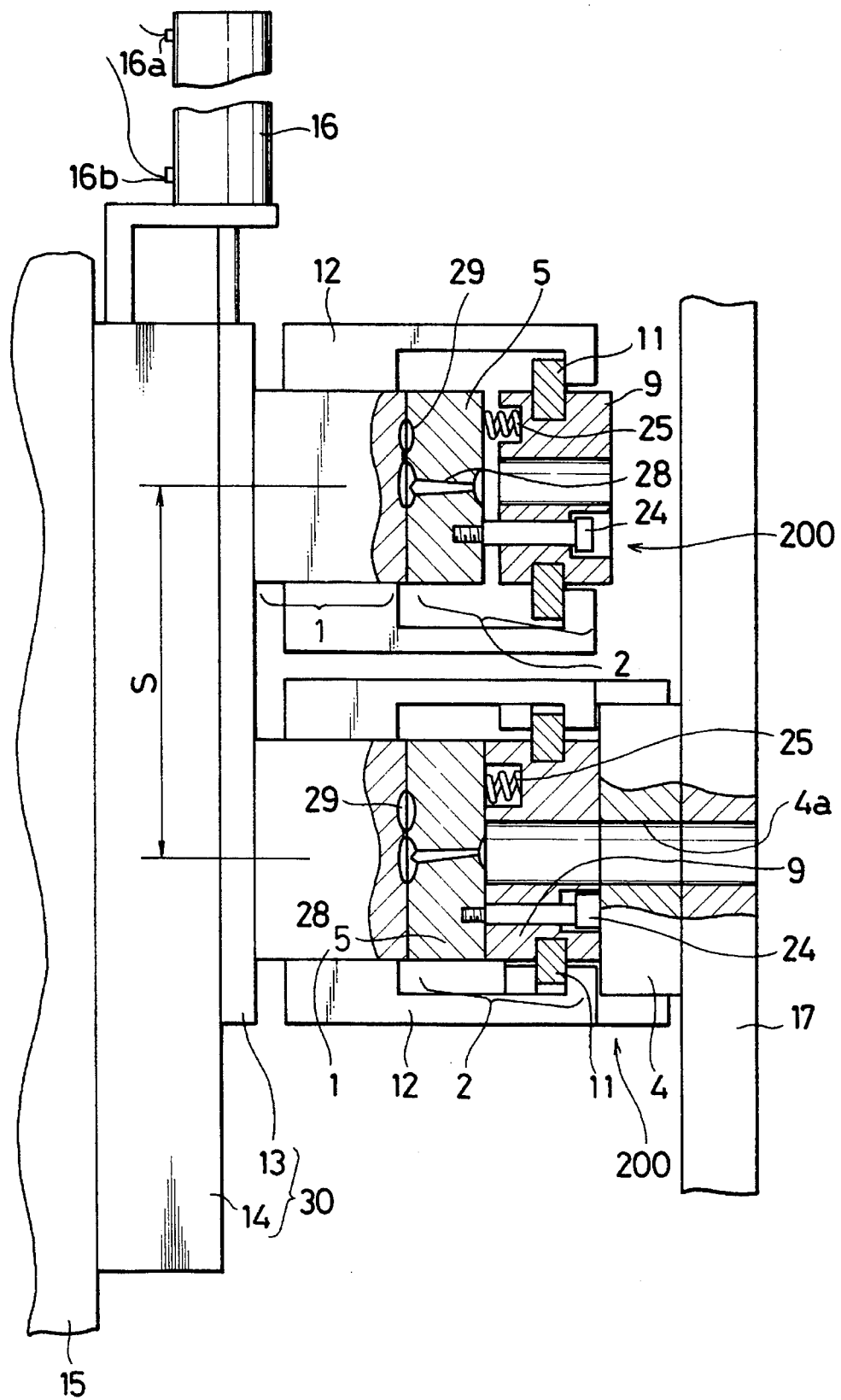
FIG. 8 is a side elevational view of the first embodiment in the mold-clamped state.
Figure 9:
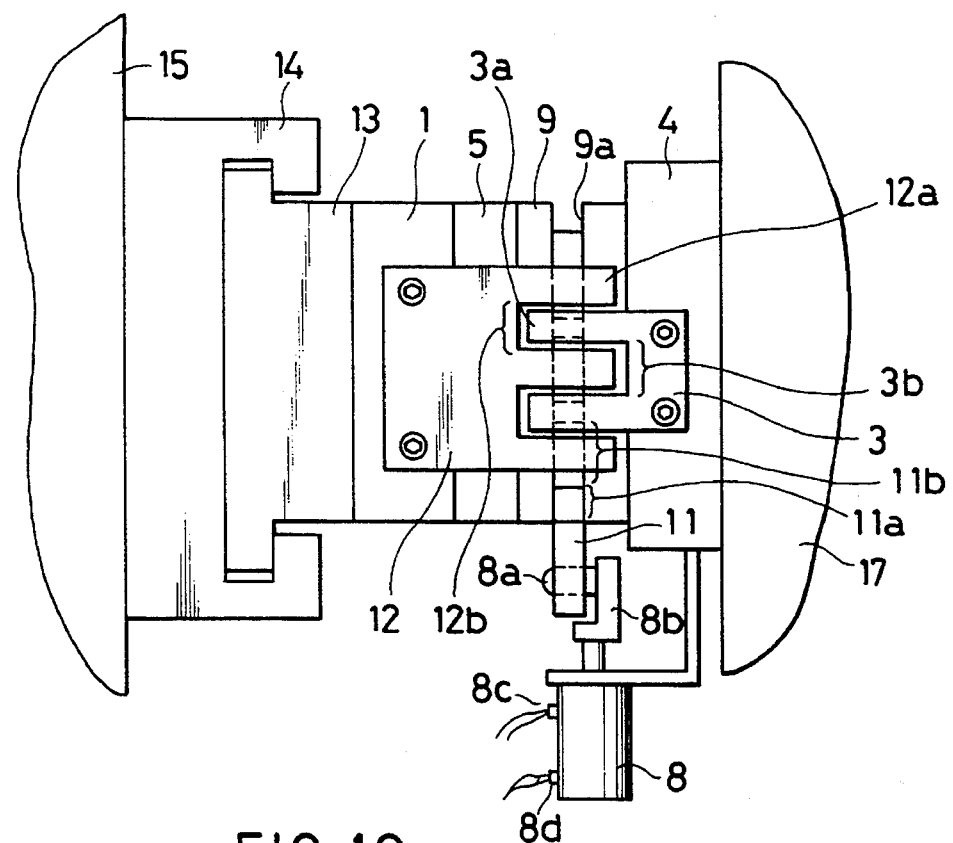
FIG. 9 is a bottom views of the first embodiment showing an operation of the locking member.

FIGS. 8 and 9 show the state in which the movable platen 15 is advanced toward the removable cavity unit 2 in the above-described state so as to clamp the mold. In the lower cavity units 200, the connecting pin 8a of the actuator 8 enters the connection hole 11c of the locking member 11, so that the locking member 11 is connected with the actuator 8.

Figure 10:
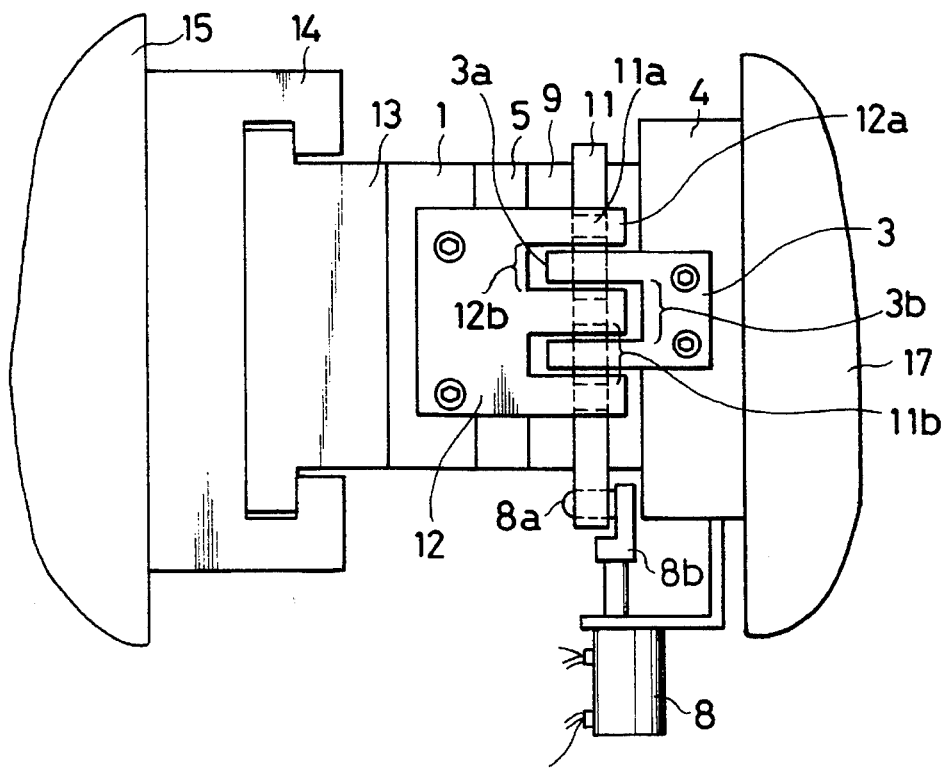
FIG. 10 is a bottom view of the first embodiment showing another operation of the locking member.

FIG. 10 shows the actuator 8 in the driving state. The rod 8b of the actuator 8 extends by the stroke of P/2, and the locking member 11 slides by the same stroke. By this sliding motion, the engagement of the hooking pieces 3a of the hooking member 3 with the projections 11a of the locking member 11 is released, and simultaneously the hooking pieces 12a of the hooking member 12 engage with the projections 11a of the locking member 11.

Figure 11:
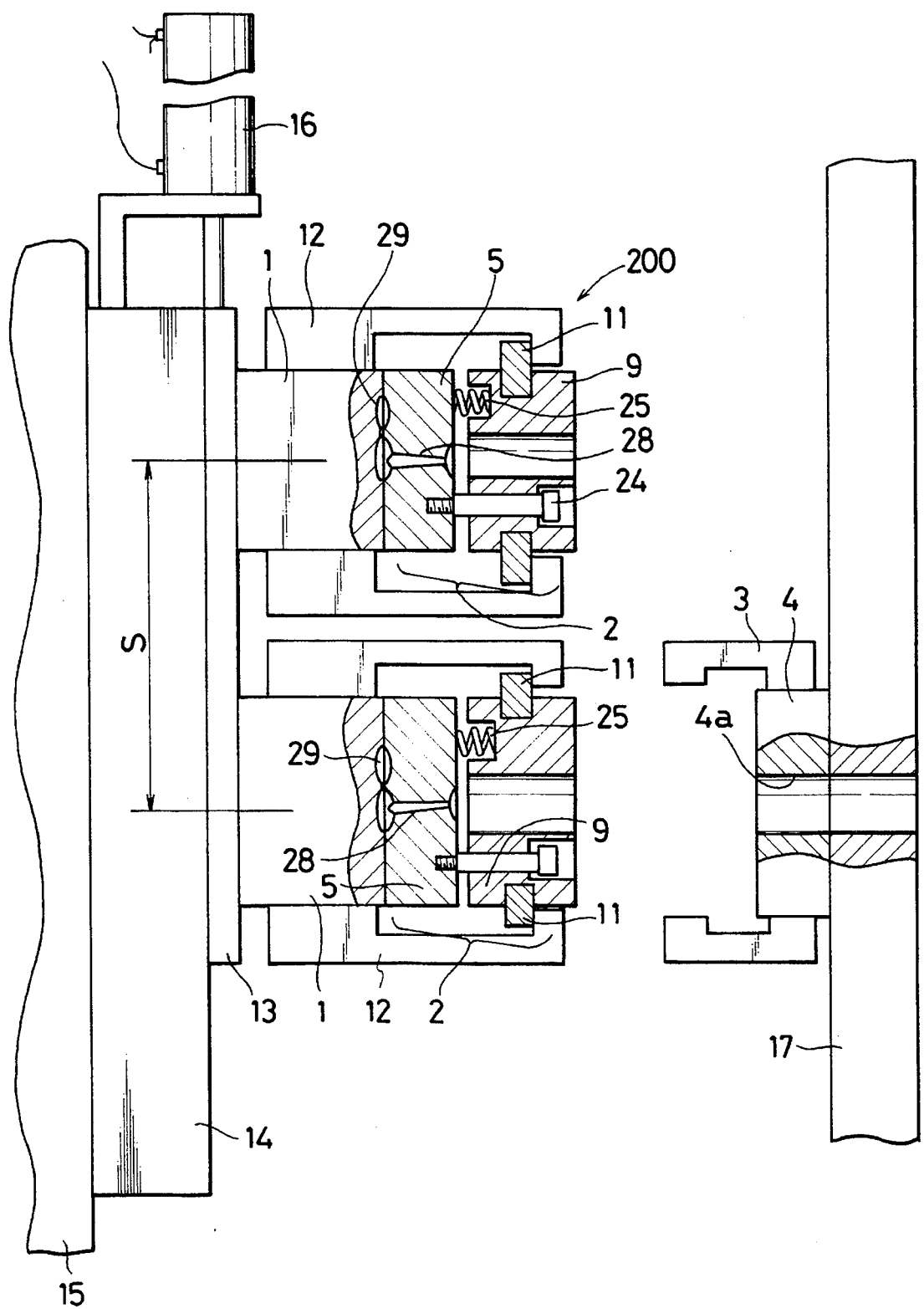
FIG. 11 is a side elevational view of the first embodiment in the mold-opened state.

FIG. 11 shows the cavity units 200 when the movable platen 15 is withdrawn from the state shown in FIG. 10. The stationary cavity unit 1 comes into close contact with the template 5 by virtue of the urging force of the spring 25. The lower cavity units 200 are separated from the fixed matrix 4 as an integral body because the stationary cavity unit 1 and the removable cavity unit 2 are connected with each other by the engagement of the hooking member 12 and the locking member 11. When the sliding plate 13 is moved downward by the stroke S by the actuator 16, the lower cavity units 200 are withdrawn from the opposite facing position with the fixed matrix 4, and the upper cavity units 200 face the fixed matrix 4. In this state, the movable platen 15 is advanced so as to bring the upper cavity units 200 into contact with the fixed matrix 4, and the locking member 11 is connected to the actuator 8. Thereafter, the same operation as that described above is repeated. In this way, according to this structure, it is possible to automatically exchange the molds by the operations of the actuators 8, 16 which are linked with the mold clamping and mold opening operations.

Figure 12:
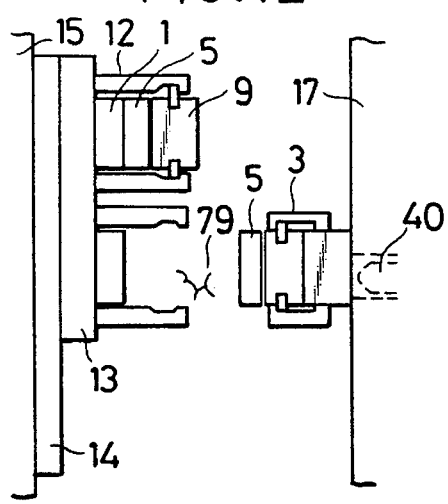
FIGS. 12 to 17 are side elevational views of the first embodiment, showing the operation thereof.
Figure 13:
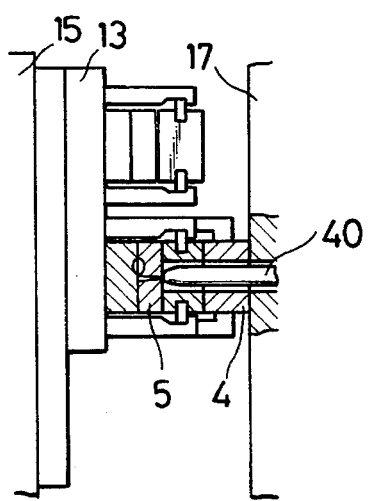
Figure 16:
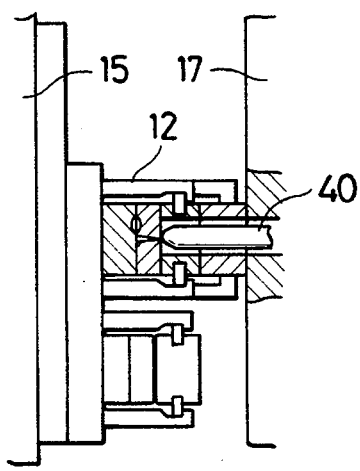
Figure 17:
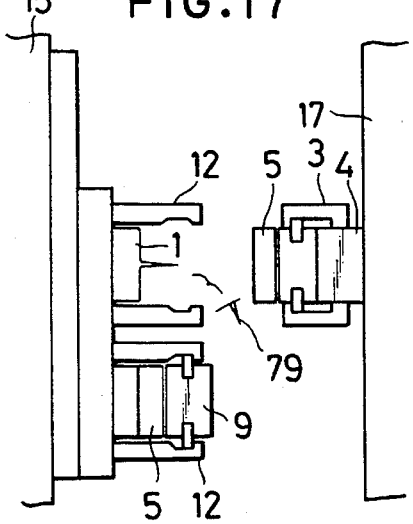
Figure 18:
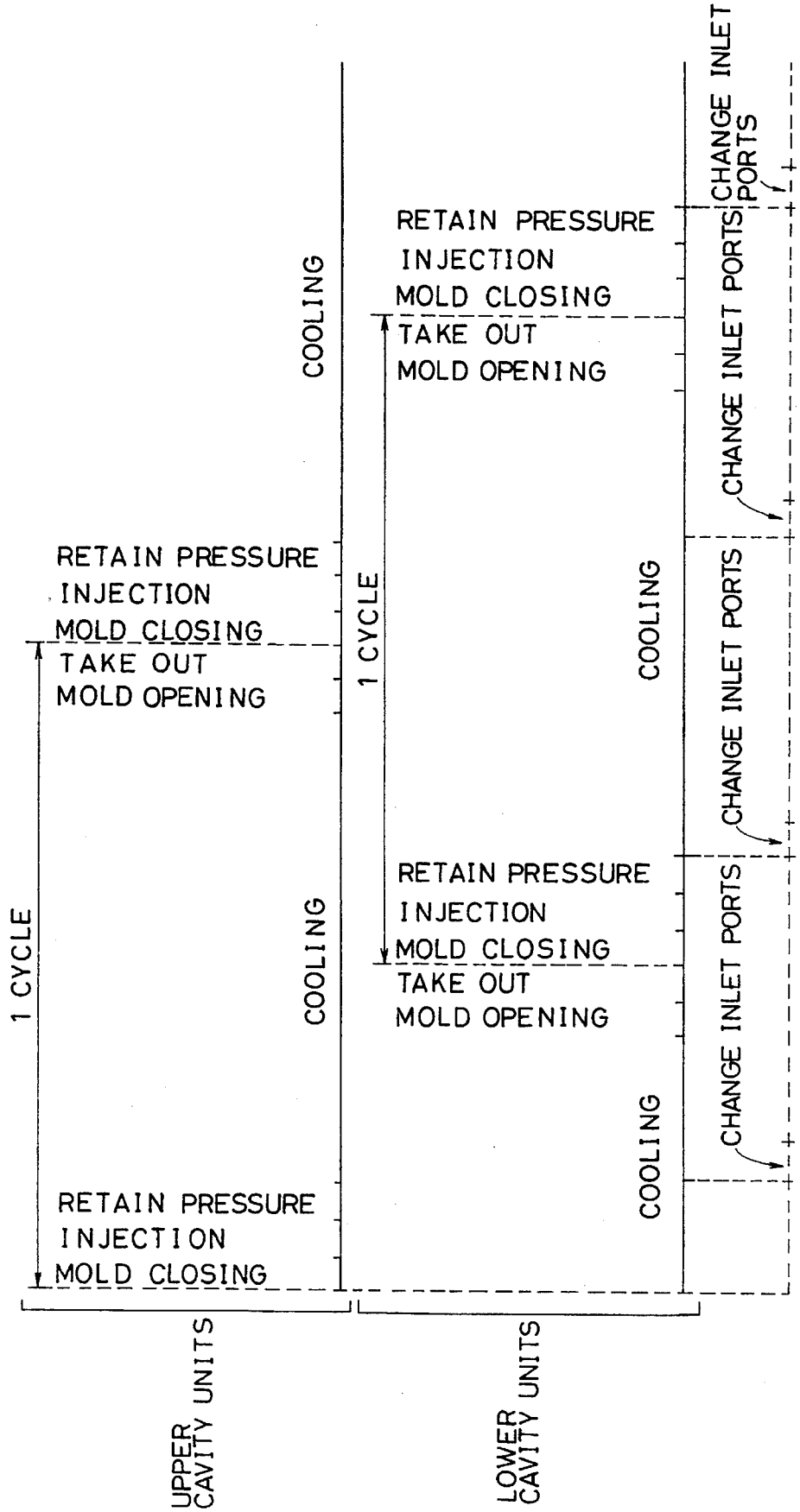
FIG. 18 is a flowchart of the operation of the first embodiment.

FIGS. 12 to 17 show the order of steps for the above-described injection molding operation. FIG. 18 is a flowchart of the operations of the two pairs of cavity units at the time of injection molding. In FIG. 12, the upper cavity units 200 are in the state of maintaining the mold-clamping force, while the lower cavity units 200 are opened for removal of a previous injection a molded product 79. In FIG. 13, the movable platen 15 advances so as to clamp the mold, and the actuator 8 is driven so as to engage the locking member 11 of the removable cavity unit 2 with the hooking member 12 of the stationary cavity unit 1. A molten resin is injected from the nozzle 40 into the cavity 29.

Figure 14:
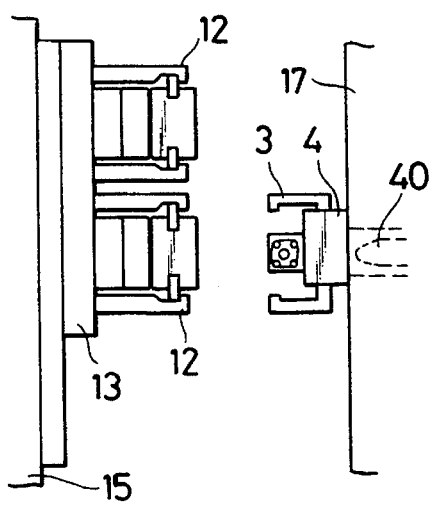

After this injection molding process, the dwell pressure is removed. In FIG. 14, the movable platen 15 is withdrawn, and the stationary cavity unit 1 and the removable cavity unit 2 are integrally moved together with the movable platen 15. The integral cavity units 200 maintain the mold-clamping force by the spring 25 and the hooking member 12, thus providing for a self-maintenance of the mold-clamping force.

Figure 15:
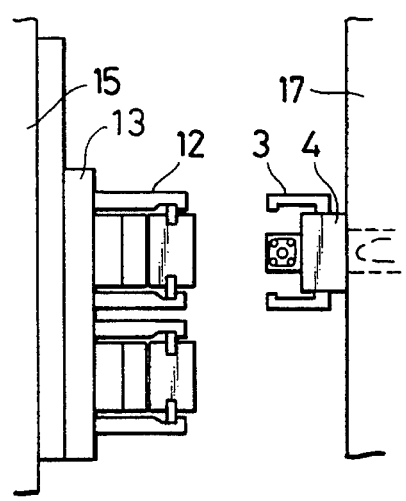

After the movable platen 15 is withdrawn, the actuator 16 is driven so as to slide the sliding plate 13 until the upper cavity units 200 reach the position where the nozzle 40 communicates with the cavity 29, as shown in FIG. 15. In the same way as described with reference to FIGS. 8 and 9, the movable platen 15 is advanced toward the fixed matrix 4. The actuator 8 is driven so that the locking member 11 engages with the hooking member 3 for opening the mold. When the movable platen 15 is withdrawn, the upper cavity units 200 are open for removal of the molded product 79 as shown in FIG. 17. A molten resin is injected from the nozzle 40, as shown in FIG. 16.

After the dwell pressure is removed, the movable platen 15 is withdrawn, as shown in FIG. 15. The upper cavity units 200 provides a self-maintenance of the mold-clamping force in the same way as the lower cavity units 200. In this state, both in the upper cavity units 200 and in the lower cavity units 200, the cavity 29 is filled with the molten resin under cooling.

After the end of cooling and solidification of the resin in the cavity 29, the actuator 16 is driven, and the sliding plate 13 is slid until the lower cavity units 200 reach the position where the nozzle 40 communicates with the cavity 29, as shown in FIG. 14.

Thereafter, the movable platen 15 is advanced for the purpose of clamping the mold, and in this state, the mold-clamping self-holding state of the lower cavity units 200 is changed into the mold-opening state by the actuator 8. In other words, the projections 11a of the locking member 11 of the lower cavity units are engaged with the hooking member 3 for opening the mold. The movable platen 15 is then withdrawn to open the parting line surfaces and to take out the molded product 79, as shown in FIG. 12.

Thereafter, the movable platen 15 is advanced again for the purpose of clamping the mold, as shown in FIG. 13, and a molten resin is charged in the lower cavity units for a second injection molding. The same self-maintenance of the mold-clamping force as in the first injection molding process is repeated, as shown in FIG. 14. The sliding plate 13 is slid until the upper cavity units 200 reach the position where the nozzle 40 communicates with the cavity 29, and the mold is opened so as to take out the molded product 79 in the same way as the lower cavity units 200, as shown in FIG. 17.

By repeating these steps, injection molding is alternately conducted by the two pairs of cavity units 200. In this case, if the injection and cooling time is different for each pair, an optimal order of injection molding is set.

According to this embodiment, since the compression force by the spring 25 is applied to the parting line surfaces of any pair of cavity units when the mold-clamping force is maintained for itself, the self-maintenance of the mold-clamping force is ensured without fear of the parting line surfaces being opened. In addition, since the operation of the actuator 8 immediately follows the mold clamping operation, the change-over between the self maintenance of the mold-clamping force and the mold opening operation of each pair of cavity units can be automatized. Furthermore, the timing for sliding the sliding plate 13 can be optimized, thereby enabling efficient production.

Figure 19:
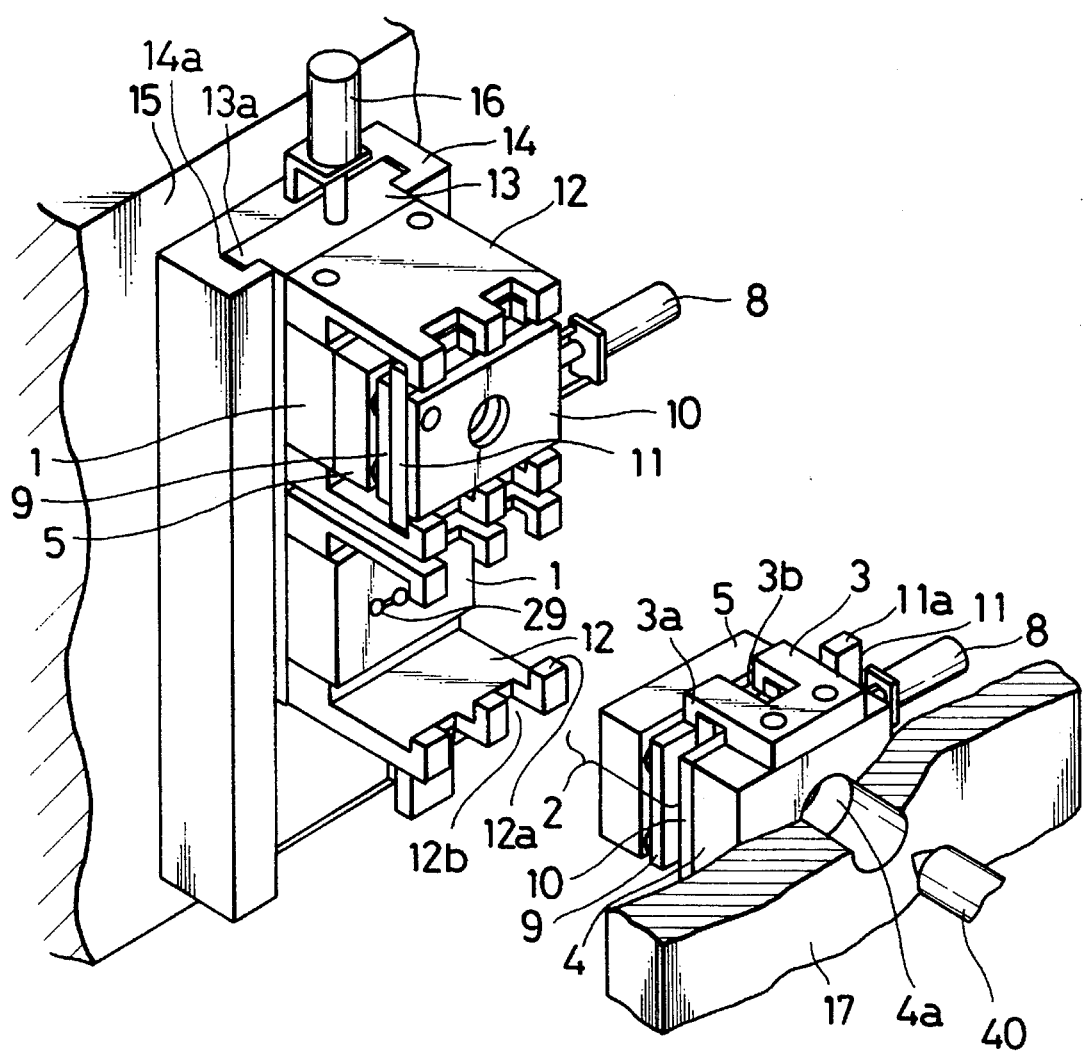
FIG. 19 is a perspective view of a second embodiment of the present invention.
Figure 20:
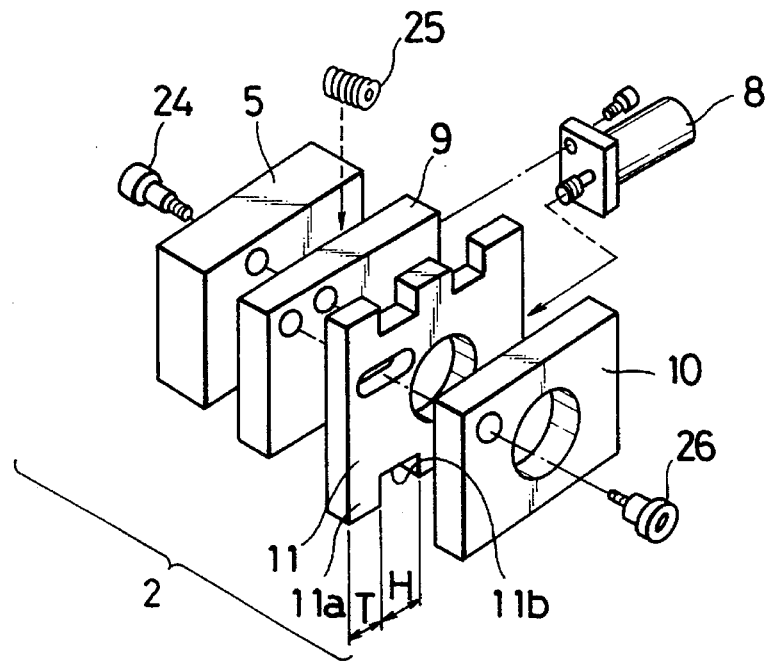
FIG. 20 is a view of a part of the second embodiment shown in FIG. 19.
Figure 21:
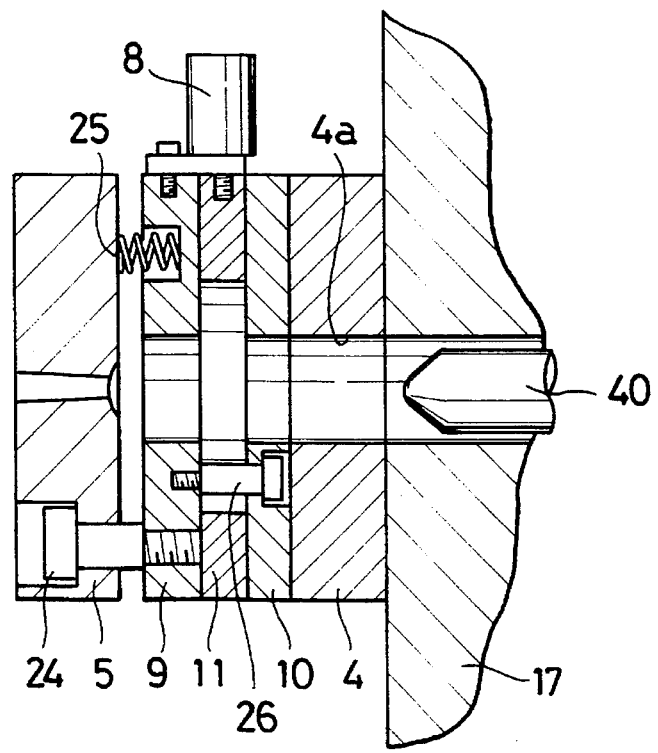
FIG. 21 is a sectional view of a part of the second embodiment, showing the operation thereof.

FIGS. 19 to 21 show a second embodiment of an injection mold device according to the present invention. By bringing a stationary cavity unit 1 into close contact with a removable cavity unit 2, the molding cavity 29 is formed. A stationary cavity unit 1 is fixed to a sliding plate 13, while the removable cavity unit 2 is removably attached to a fixed matrix 4. A sliding plate 13 is slidably attached to a mounting plate 14 which is fixed to a movable platen 15. The sliding plate 13 slides in the vertical direction orthogonal to the direction of mold opening. In order to slide the sliding plate 13, an actuator 16 which is supported by the mounting plate 14 is connected to a sliding plate 13. The dovetail groove 14a is formed in the mounting plate 14. Projecting portions 13a are inserted into the dovetail groove and are formed on the sliding plate 13 so as to guide the sliding operation of the sliding plate 13. A plurality of the (two in FIG. 19) stationary cavity units 1 are attached to the sliding plate 13 in parallel with each other, and the stationary cavity units 1 are switched over by the sliding operation of the sliding plate 13.

The removable cavity unit 2 is provided with a template 5 which comes into close contact with the stationary cavity unit 1, and first and second mounting plates 9 and 10, respectively. The second mounting plate 10 is removably attached to a fixed platen 17 through the fixed matrix 4, as shown in FIG. 21. A spring 25, provided as an elastic member for maintaining the mold-clamping force is inserted between the template 5 and the first mounting plate 9. The spring 25 urges the template 5 toward the stationary cavity unit 1. Due to the spring 25, a gap is formed between the template 5 and the first mounting plate 9, but the amount of movement of the template 5 caused by the urging force of the spring 25 is regulated by a stop pin 24.

The first mounting plate 9 and the second mounting plate 10 are combined together in such a manner as to have a predetermined gap therebetween defined by a stop pin 26. The locking member 11 is inserted into the gap between the mounting plates 9, 10. A locking member 11 is provided on the upper and the lower ends thereof with a plurality of projections 11a having a dimension of T with a recess 11b having a dimension of H between two adjacent projections 11a.

These projections 11a and recesses 11b are provided in order to link the self-maintenance and the release of the mold-clamping force with the mold clamping operation and the mold opening operation, respectively, as will be later described. The reference numeral 8 represents an actuator for sliding the locking member 11 in the direction of mold opening. In this embodiment, an actuator 8 is fixed to the end surface of the first mounting plate 9 of the removable cavity unit 2 The reference numeral 40 denotes a nozzle for injecting a molten resin, and 4a a clearance hole formed in the fixed matrix 4 so as to advance the nozzle 40 therethrough.

A hooking member 3 for opening the mold is attached to the fixed matrix 4 and the hooking member 12 for maintaining a mold-clamping force is attached to each stationary cavity unit 1. The hooking member 3 is fixed at the upper end and the lower end (not shown) of the fixed matrix 4 and is provided with hooking pieces 3a in such a manner as to extend in the direction of mold opening and be bent inward at the end portion. A slit 3b is provided between the hooking pieces 3a. The hooking pieces 3a and the slit 3b are engaged with or released from the projections 11a and the recesses 11b of the locking member 11.

The hooking member 12 for maintaining the mold-clamping force is attached to the upper end surface and the lower end surface of each of the stationary cavity units 1 of the two pairs of cavity units arranged in parallel with each other. The hooking pieces 12a having a slightly larger dimension than T, which is the dimension of the projection 11a of the locking member 11, and the slits 12b having a slightly larger dimension than H, which is the dimension of the recess 11b of the locking member 11, are alternately formed at the end of each hooking member 12. These hooking pieces 12a and the slits 12b are engaged with or released from the projections 11a and the recesses 11b of the locking member 11.

The operation of the second embodiment will now be explained.

When one pair of cavity units 200 is situated at the position where the nozzle 40 communicates with the cavity 29, the movable platen 15 is advanced toward the removable cavity unit 2 so as to clamp the mold. In this state, a molten resin is injected into the cavity 29. After the dwell pressure is removed, the locking member 11 is moved in the direction orthogonal to the direction of mold opening by the actuator 8 until the projections 11a are situated at the hooking pieces 12a of the hooking member 12 and the recesses 11b are situated at the slits 12b of the hooking member 12. The cavity units 200 are moved as an integral body together with the movable platen 15. At this time, since the template 5 is pressed against the stationary cavity unit 1 by the urging force of the spring 25, the parting line surfaces are closed and the mold-clamping force is maintained. After the withdrawal of the movable platen 15, the actuator 16 is driven so as to slide the sliding plate 13 until the other pair of cavity units reaches the position where the nozzle 40 communicates with the cavity 29. In the same way as described above, after the steps of mold clamping, injection and mold opening, the actuator 16 is driven so as to slide the sliding plate 13 until the first pair of cavity units, which is in the mold-clamping force self-maintaining state reaches the position where the nozzle 40 communicates with the cavity 29.

Thereafter, the movable platen 15 is advanced toward the removable cavity unit 2, and the actuator 8 is driven in this state, so that the recesses 11b of the locking member 11 are situated at the hooking pieces 12a of the hooking member 12 and the projections 11a are situated at the slits 12b and at the hooking pieces 3a of the hooking member 3. By this operation, the engagement of the hooking member 12 of the stationary cavity unit 1 with the locking member 11 is released and the hooking member 3 of the fixed matrix 4 is engaged with the locking member 11. That is, the removable cavity unit 2 is engaged with the fixed matrix 4. Consequently, when the movable platen 15 is withdrawn, the parting line surfaces are open and the molded product is taken out.

After the steps of mold clamping, injection and mold opening are repeated, the second pair of cavity units is moved to the the position where the nozzle 40 communicates with the cavity 29. In the same way as described above, the mold is opened and the molded product is taken out. By repeating these steps, injection molding is conducted by alternately using the pairs of cavity units.

According to this embodiment, since the compression force by the spring 25 is applied to the parting line surfaces of the cavity units when the mold-clamping force is maintained even if the inner pressure of the resin is applied to the hooking member 12, the parting line surfaces are not opened. In addition, since the actuator 8 is driven immediately after the mold clamping operation, it is possible to start or stop the self-maintenance of the mold-clamping force of the cavity units 1 and 2. In other words, the self-maintenance of the mold-clamping force can be automatized. In addition, since the start/termination of the self-maintenance of the mold-clamping force and the engagement/release of the removable cavity unit 2 with and from the fixed matrix 4 are simultaneously changed over with the mold clamping operation, there is no error in the operation, so that it is possible to prevent breakage of the mold caused by such an error. In this case, if the pitch between the projection 11a and the recess 11b is reduced, it is possible to shorten the stroke of change-over of the start/termination of the self-maintenance of the mold-clamping force.

Figure 22:
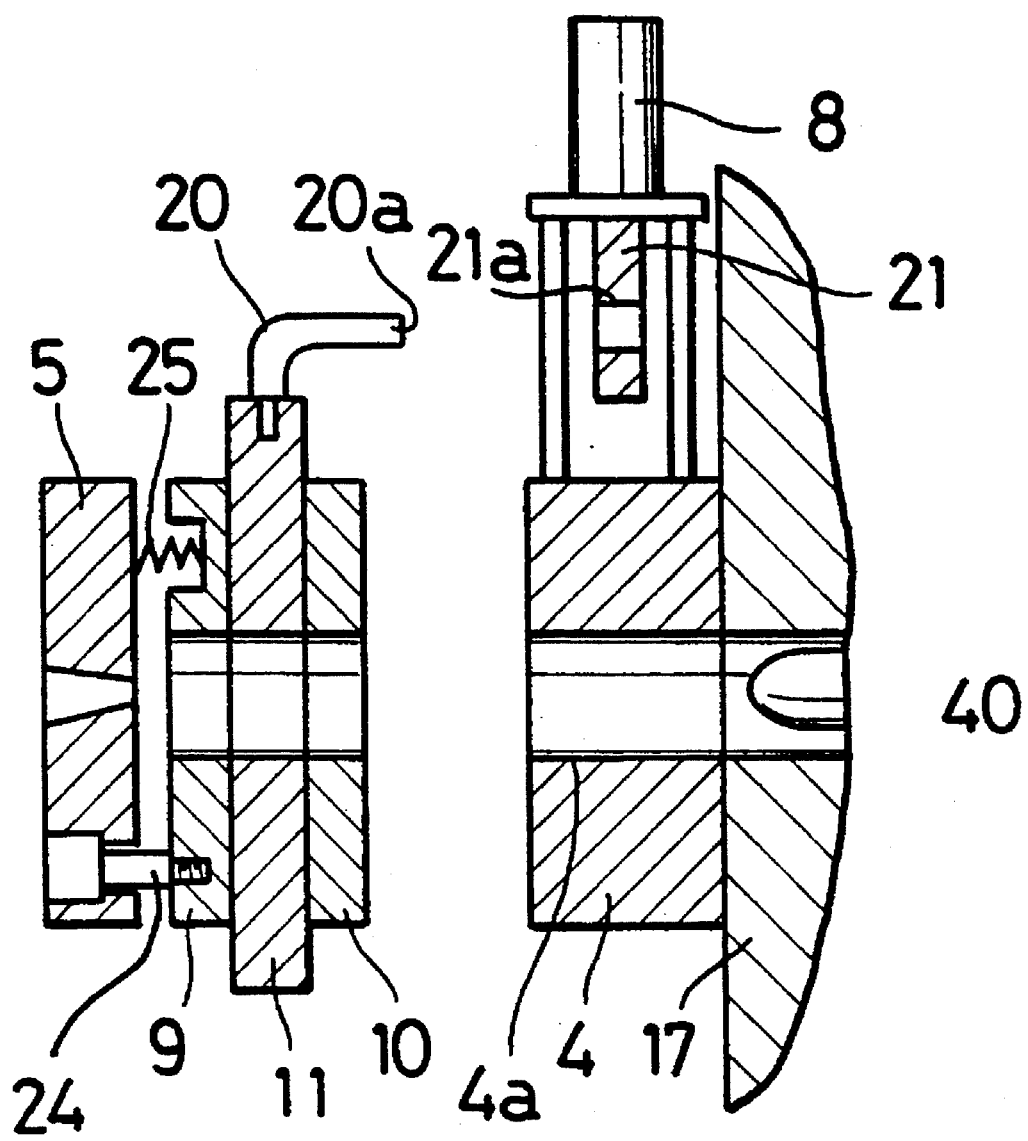
FIG. 22 is a sectional view of a modification of the second embodiment.
Figure 23:
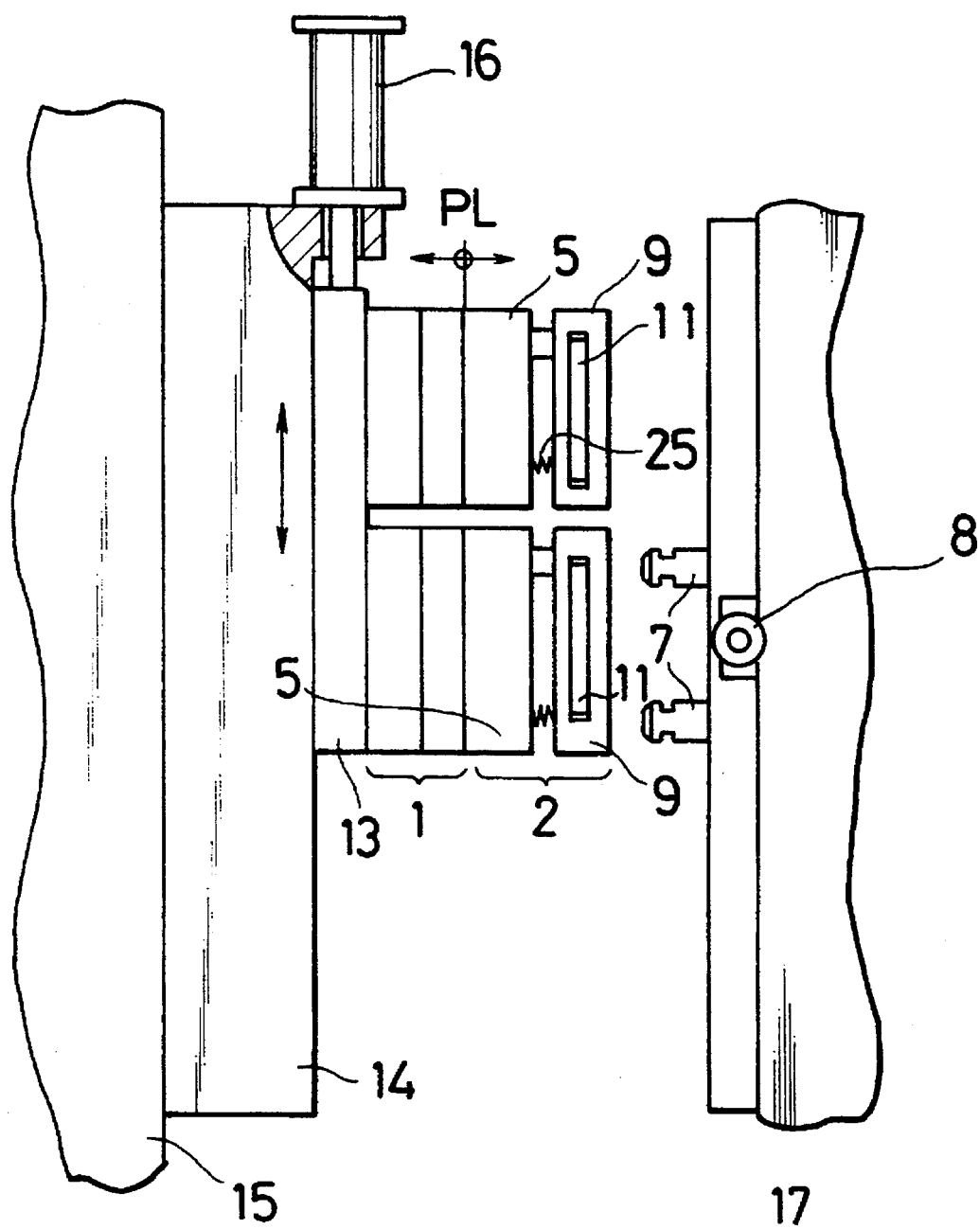
FIG. 23 is a side elevational view of a third embodiment of the present invention.

FIG. 22 shows a modification of the second embodiment. The same reference numerals are provided for the elements which are the same as those in the second embodiment. In this modification, a connecting rod 20 extending toward the fixed platen 17 is attached to the end surface of the locking member 11 which is inserted between the first and the second mounting plates 9, 10. A projecting rod 21 is provided on the end surface of the fixed matrix 4 so as to correspond to the connecting rod 20. The projecting rod 21 has an insertion hole 21a and is attached to the output end of the actuator 8.

In this structure, when the mold is clamped with the insertion hole 21a of the projecting rod 21 in correspondence with the end portion 20a of the connecting rod 20, the connecting rod 20 enters the insertion hole 21a of the projecting rod 21. By driving the actuator 8 in this state, the locking member 11 is moved vertically, to thereby engage or release from the hooking member 12 for maintaining the mold-clamping force or the hooking member 3 of the fixed matrix 4.

Therefore, the single actuator 8 copes with the plurality of removable cavity units 2 and moves the locking member 11 for the self-maintenance or the release of the mold-clamping force. Thus, the number of parts is reduced, the structure and the assembly of the mold device is made simpler, and the control thereof is facilitated.

FIGS. 23 to 26 show a third embodiment of the present invention. The mounting plate 14 constituting the matrix 30 is attached to the movable platen 15. The sliding plate 13 is attached to the movable platen 15. The actuator 16 slides the sliding plate 13 in the vertical direction which is orthogonal to the direction of mold clamping. The stationary cavity unit 1 is attached to the sliding plate 13.

The removable cavity unit 2 is provided with the template 5 which is brought into close contact with the stationary cavity unit 1 so as to form a cavity and the mounting plate 9 to which the template 5 is attached. These elements are removable from the fixed matrix 4. A bore 9n is formed in the central portion of the mounting plate 9 in the vertical direction which is orthogonal to the direction of mold clamping. The locking member 11 is slidably inserted into the bore 9n. The sliding operation of the locking member 11 is conducted by the actuator 8 attached to the fixed matrix 4. By driving the actuator 8 with the connecting pin 8a inserted into the connection hole 11c of the locking member 11, the locking member 11 is slid back and forth through the mounting plate 9. This sliding motion enables the locking member 11 to engage with or release from a guide pin 6, for maintaining the mold-clamping force, and a guide pin 7, for opening the mold which will be later described. The spring 25 is inserted between the template 5 and the mounting plate 9 so as to urge the template 5 toward the stationary cavity unit 1 for the purpose of maintaining the mold-clamping force. The stop pin 24 is inserted between the template 5 and the mounting plate 9 so as to regulate the amount of movement caused by the urging force of the spring 25.

Figure 24:
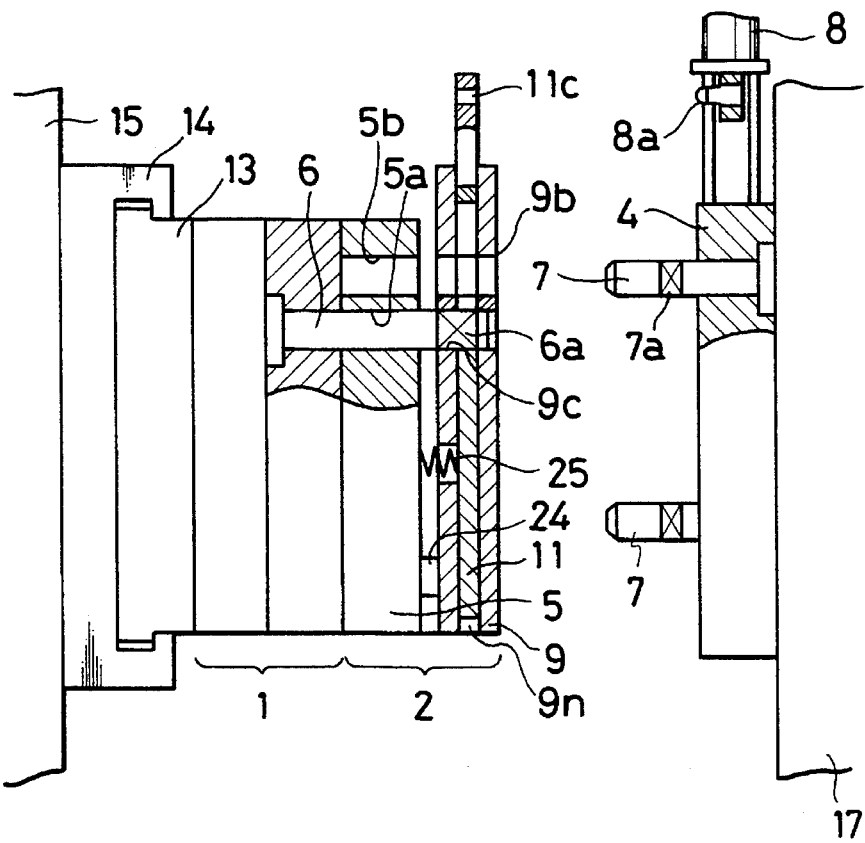
FIG. 24 is a bottom view of a part of the third embodiment, showing the operation thereof.

A pair of guide pins 6 for maintaining the mold-clamping force are arranged on the stationary cavity unit 1 in the vertical direction, and a pair of guide pins 7 for opening the mold are arranged on the fixed matrix 4 in the vertical direction, as shown in FIG. 24. The guide pins 6, 7 extend in the direction of mold opening, but not in opposite aligned positions.

Figure 25:
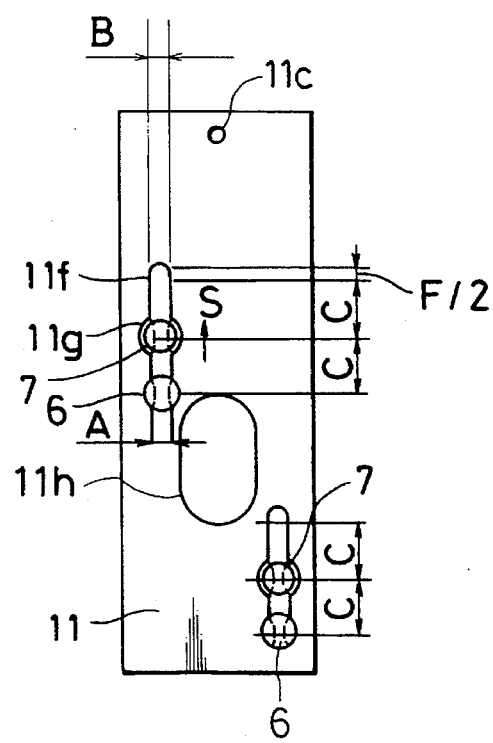
FIGS. 25 and 26 are elevational views of the locking member of the third embodiment.
Figure 26:
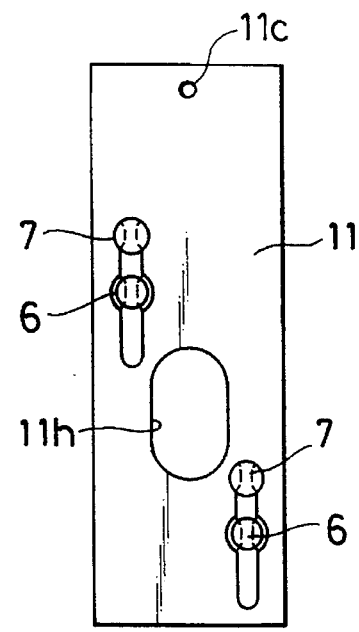

FIGS. 25 and 26 are elevational views of the locking member 11. The guide pins 6 and 7 have an equal diameter F and they are provided with D-shaped cut portions 6a, 7a having a dimension of A. The guide pin 6 engages the locking member 11 at the position where the stationary cavity unit 1 and the removable cavity unit 2 maintain the mold-clamping force, as shown in FIG. 25, while the guide pin 7 engages with the locking member 11 at the position where the removable cavity unit 2 is held by the fixed matrix 4. These guide pins 6 and 7 are removably inserted into the removable cavity unit 2. For this purpose, insertion holes 5a and 9c are formed in the template 5 and the mounting plate 9, respectively, at the positions corresponding to the guide pins 6, while insertion holes 5b and 9b are formed in the template 5 and the mounting plate, respectively, at the positions corresponding to the guide pins 7.

In the locking member 11, slots 11f for receiving the two sets of guide pines 6 and 7 are formed in the direction of movement (indicated by the arrow S) of the locking member 11, as shown in FIG. 25, and an unlocking hole 11g which has a large diameter and communicates with the slot 11f is formed at a part of each slot 11f. The width B of the slot 11f is larger than the dimension B of the cut portions 6a, 7a of the guide pins 6, 7, respectively, and smaller than the outer diameter F of the guide pins 6, 7. The diameter of the unlocking hole 11g is larger than the outer diameter F of these guide pins 6, 7. The length of the slot 11f is at least C+F/2, wherein C represents the stroke of slide C of the locking member 11, and F represents the outer diameter of the guide pins 6, 7. The length of the slot 11 may be extended in the direction of S or opposite thereto.

When either of the cut portion 6a of the guide pin 6 for maintaining the mold-clamping force and the cut portion 7a of the guide pin 7 for opening the mold is situated in the unlocking portion 11g, the corresponding guide pin 6 or 7 is unlocked and becomes removable from the locking member 11. On the other hand, when the cut portions 6a or 7a is situated in the slot 11f, it engages with the locking member 11 in the locked state.

In FIGS. 25 and 26, the reference numeral 11h represents a clearance hole of the nozzle 40. The clearance hole 11h has a larger width than the diameter of the nozzle 40 and has a length at least the same as the stroke of slide C of the locking member 11.

The operation of this embodiment will now be explained. In the first embodiment, the hooking member 12 for maintaining the mold-clamping force of the stationary cavity unit 1 and the hooking member 3 for opening the mold of the fixed matrix 4 are alternately engaged with and released from the locking member 11 by the sliding operation of the locking member 11. In contrast, in this embodiment, the guide pins 6 for maintaining the mold-clamping force and the guide pins 7 for opening the mold are alternately engaged with and released from the locking member 11 by the sliding operation of the locking member 11. The other operations are the same as in the first embodiment. This embodiment is advantageous in that it is possible to provide the guide pins 6 for maintaining the mold-clamping force at the portions to which the inner pressure of a resin is applied.

FIGS. 27 to 32 show a fourth embodiment of the present invention. The movable platen 15 and the fixed platen 17 are arranged in such a manner as to face each other, and the mounting plate 14 is attached to the movable platen 15, while the fixed matrix 4 is attached to the fixed platen 17. The sliding plate 13 is attached to the mounting plate 14.

Figure 27:
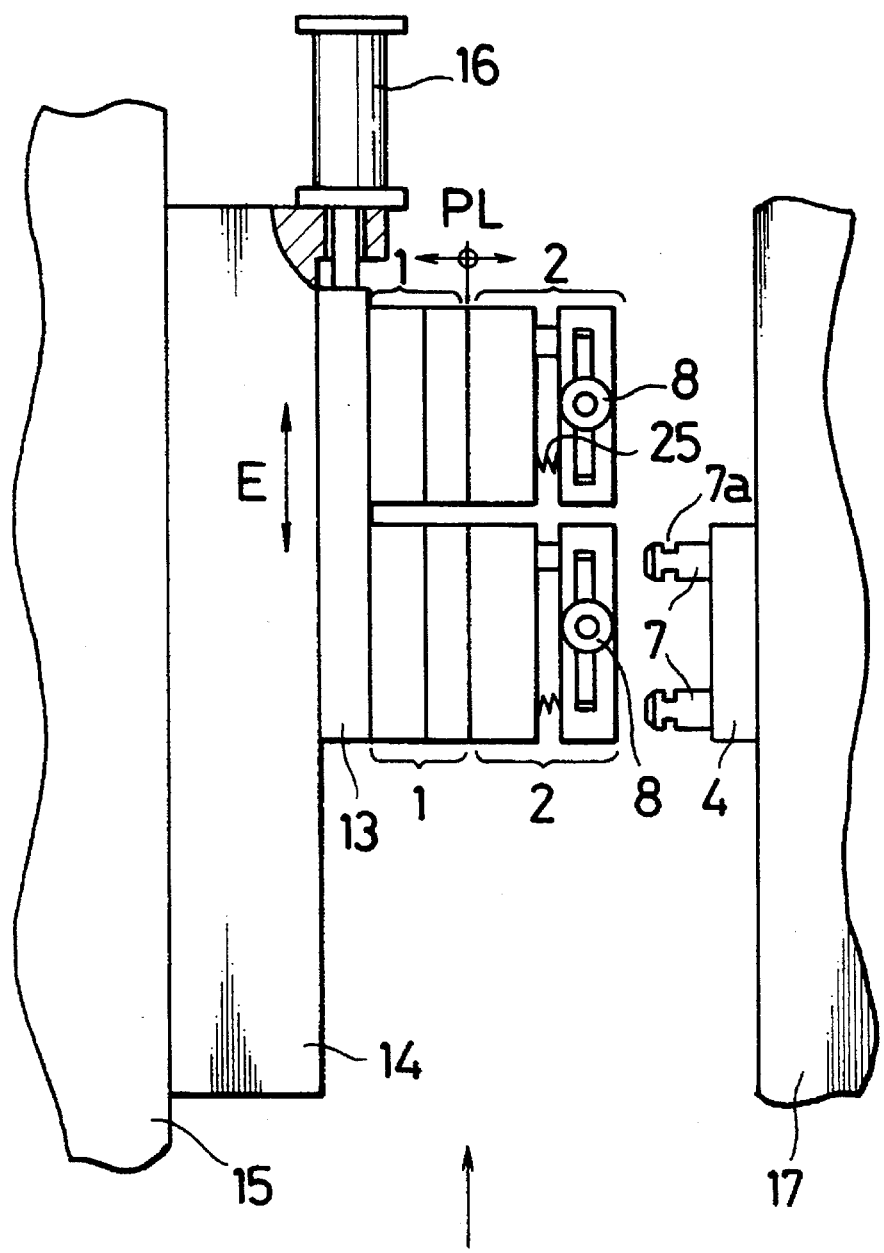
FIG. 27 is a side elevational view of a fourth embodiment of the present invention.
Figure 28:
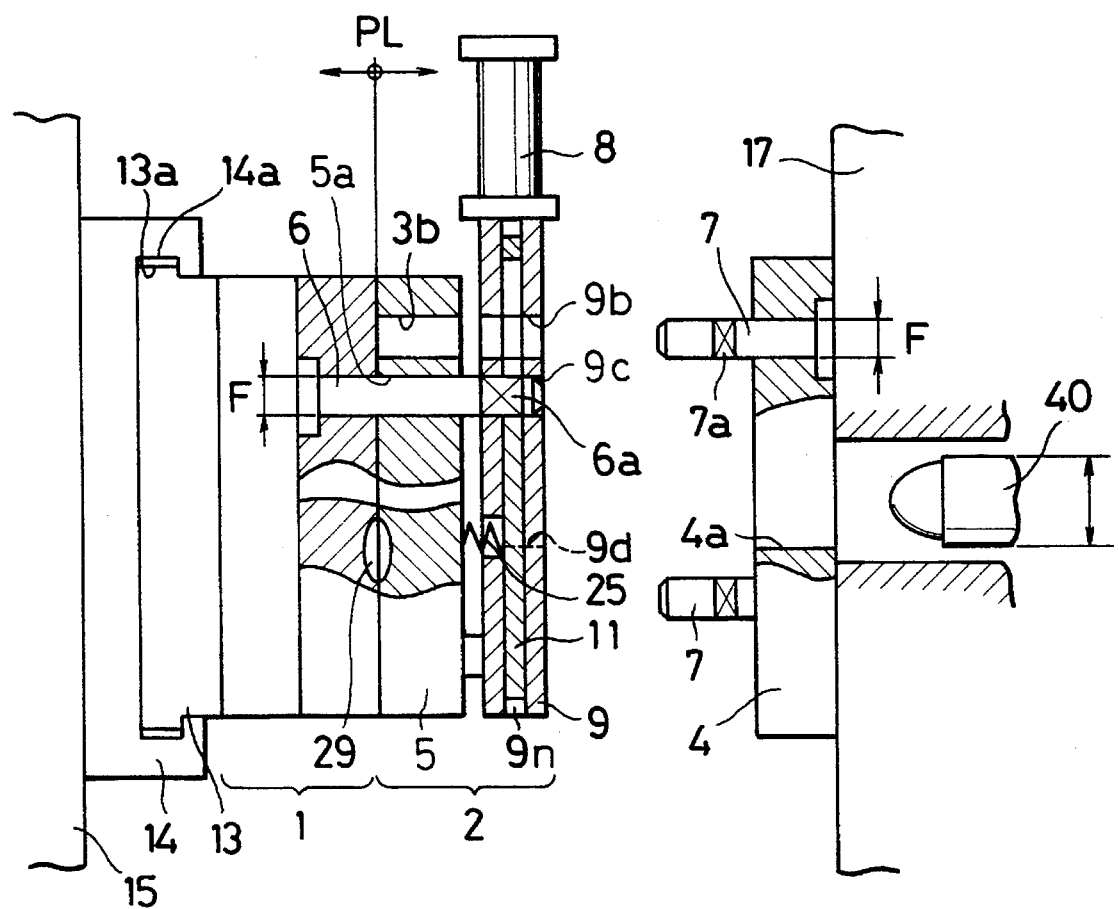
FIG. 28 is a bottom view of a part of the fourth embodiment, showing the operation thereof.

In order to attach the sliding plate 13 to the mounting plate 14, an annular rail portion 13a is formed at both ends of the sliding plate 13. Rail grooves 14a are provided on the sliding plate 13 and slidably inserted into the corresponding rail portions 13a, as shown in FIG. 28. The sliding plate 13 is connected to the actuator 16, as shown in FIG. 27, and slid in the direction indicated by the arrow E by operation of the actuator 16. The direction indicated by the arrow E is orthogonal to the direction of mold opening (or mold clamping), and a plurality of (two in FIG. 27) stationary cavity units 1 are arranged in parallel with each other in the direction indicated by the arrow E. The stroke of slide of the sliding plate 13 is larger than the pitch at which the stationary cavity units 1 arranged in parallel move to the position where the nozzle 40 communicates with one of the stationary cavity units 1 (see FIG. 28). When the sliding plate 13 is moved, one of the stationary cavity units 1 is moved to the injection position and the other to the cooling position which is apart from the injection position. When the sliding plate 13 is returned, the stationary cavity units 1 are moved vice versa. In this way, it is possible to alternately move the plurality of cavity units 1 to the injection position and the cooling position.

The removable cavity unit 2 is removably attached to the fixed matrix 4 which is fixed to the fixed platen 17. The guide pins 7 for opening the mold are provided on the fixed matrix 4. The nozzle 40 for injecting a molten resin therethrough is provided in the fixed platen 17. An opening 4a for advancing and withdrawing the nozzle 40 therethrough is provided in the fixed matrix 4, as shown in FIG. 28.

Figure 32:
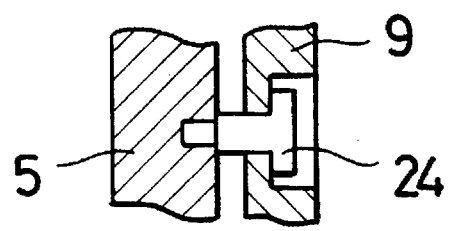
FIG. 32 is a sectional view of the stop pin of the fourth embodiment.

By bringing the stationary cavity unit 1 into close contact with the removable cavity unit 2, the cavity 29 which communicates with the nozzle 40 is formed, as shown in FIG. 28. The stationary cavity unit 1 and the removable cavity unit 2 constitute a pair of cavity units. The stationary cavity unit 1 is provided with the template 5 for forming the cavity 29 between the stationary cavity unit 1 and the removable cavity unit 2. The mounting plate 9 is connected to the template 5 and the locking member 11 is inserted into the mounting plate 9. An elastic member composed of a spring 25 is inserted between the template 5 and the mounting plate 9. The spring 25 urges the template 5 toward the stationary cavity unit 1 so that they are brought into close contact with each other. The pair of cavity units constituted by the stationary cavity unit 1 and the removable cavity unit 2 is inwardly urged in the direction of mold clamping by the spring 25. A stop pin 24 is provided between the template 5 and the mounting plate 9 to regulate the movement of the template 5. FIG. 32 shows the arrangement for attaching the stop pin 24 to the template 5 and the mounting plate 9. The screw portion at the end of the stop pin 24 is screwed into the template 5, the shaft portion penetrates through the mounting plate 9 and the head portion comes into contact with the mounting plate 9. That is, the template 5 is slidable with respect to the mounting plate 9 by the length corresponding to the length of the shaft portion of the stop pin 24.

A bore portion 9n is formed in the central portion of the mounting plate 9 in the vertical direction which is orthogonal to the direction of mold clamping, and the locking member 11 is slidably inserted into the bored portion 9n. The locking member 11 is connected to the actuator 8 which is attached to the end portion of the mounting plate 9. The actuator 8 is disposed such that it is orthogonal to the direction of mold clamping and it acts in the direction orthogonal to the direction in which the actuator 16 attached to the sliding plate 13 acts, as shown in FIG. 27. By the operation of the actuator 8, the locking member 11 slides back and forth within the mounting plate 9. This sliding motion enables the locking member 11 to engage with or release from the guide pins 6 for maintaining the mold-clamping force and the guide pins 7 for opening the mold.

The mechanism for engaging or releasing the locking member 11 will now be explained with reference to FIG. 28.

Figure 29:
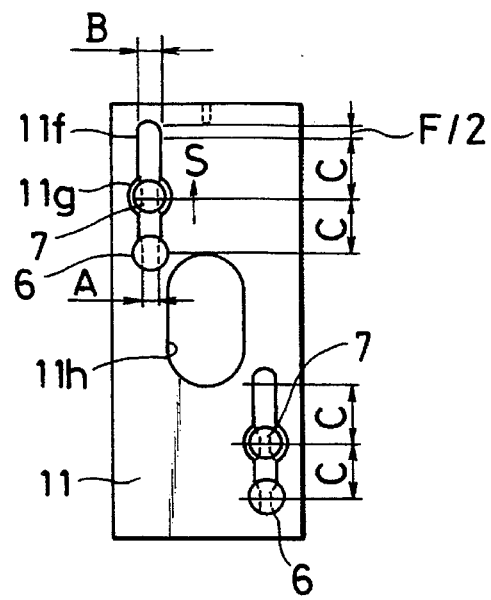
FIG. 29 is an elevational view of the locking member of the fourth embodiment.

A pair of guide pins 6 for maintaining the mold-clamping force are arranged on the stationary cavity unit 1, and a pair of guide pins 7 for opening the mold are arranged on the fixed mold 4. The guide pins 6, 7 extend in the direction of mold opening, but are not in opposite aligned positions, as shown in FIG. 29. In each set, the guide pins 6 and 7 are arranged with a distance approximately equal to the stroke of slide C of the locking member 11 therebetween.

Figure 30:
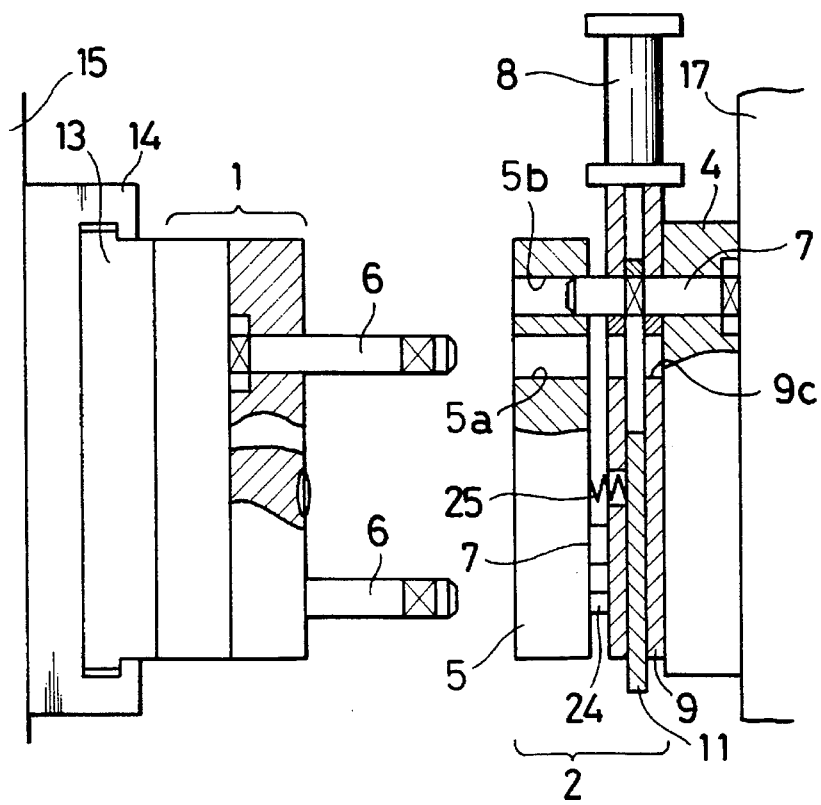
FIG. 30 is a bottom view of a part of the fourth embodiment, showing the operation thereof.

The guide pins 6 and 7 have an approximately equal diameter F and they are provided with D-shaped cut portions 6a, 7a having a dimension of A. In this case, the cut portion 6a is provided at an end portion of the guide pin 6, while the cut portion 7a is provided at a middle portion of the guide pin 7. The guide pin 6 engages with the locking member 11 at the position where the stationary cavity unit 1 and the removable cavity unit 2 maintain the mold-clamping force, as shown in FIG. 28, while the guide pin 7 engages with the locking member 11 at the position where the removable cavity unit 2 is held by the fixed matrix 4, as shown in FIG. 30. These guide pins 6 and 7 are removably inserted into the removable cavity unit 2. For this purpose, insertion holes 5a and 9c are formed in the template 5 and the mounting plate 9, respectively, at the positions corresponding to the guide pins 6. Insertion holes 5b and 9b are formed in the template 5 and the mounting plate 9, respectively, at the positions corresponding to the guide pins 7.

In the locking member 11, the slots 11f are formed in the direction of movement (indicated by the arrow S) of the locking member 11, as shown in FIG. 29. The unlocking hole 11g having a large diameter and which communicates with the slot 11f is formed at a part of each slot 11f. The width B of the slot 11f is larger than the dimension B of the cut portions 6a, 7a of the guide pins 6, 7, and smaller than the outer diameter F of the guide pins 6, 7. The diameter of the unlocking hole 11g is larger than the outer diameter F of the guide pins 6, 7. The length of the slot 11f is at least C+F/2, wherein C represents the stroke of slide C of the locking member 11, and F represents the outer diameter of the guide pins 6, 7. The length of the slot 11 may be extended in the direction of S or opposite thereto.

When either of the cut portions 6a of the guide pin 6 for maintaining the mold-clamping force and the cut portion 7a of the guide pin 7 for opening the mold is situated in the unlocking portion 11g, the corresponding guide pin 6 or 7 is unlocked and becomes removable from the locking member 11. On the other hand, when the cut portions 6a or 7a is situated in the slot 11f, it engages with the locking member 11 in the locked state.

Figure 31:
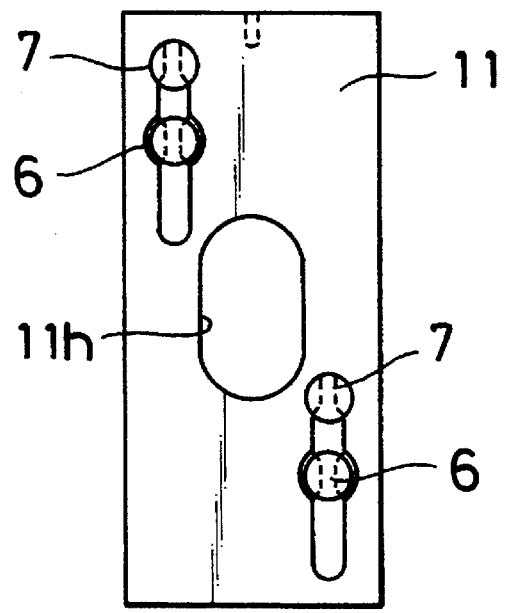
FIG. 31 is an elevational view of the locking member of the fourth embodiment explaining the operation thereof.

In FIGS. 29 and 31, the reference numeral 11h represents a clearance hole of the nozzle 40. The clearance hole 11h has a larger width than the diameter of the nozzle 40 and has a length at least the same as the stroke of slide C of the locking member 11. The reference numeral 9d in FIG. 28 represents a clearance hole of the nozzle 40 which is formed in the mounting plate so as to communicate with the clearance hole 11h.

The operation of the fourth embodiment will now be explained.

When one pair of the cavity units is situated at the position where the nozzle 40 communicates with the cavity 29, the movable platen 15 is advanced toward the removable cavity unit 2 so as to clamp the mold. In this state, a molten resin is injected into the cavity 29. After the dwell pressure is removed, the nozzle 40 is removed from the template 5 and the actuator 8 is driven so as to move the locking member 11 in the direction indicated by the arrow S by the distance C. By this operation, the guide pins 6 engage with the slots 11f of the locking member 11 in the locked state, and the guide pins 7 are situated in the unlocking holes 11g and assume an unlocked state, as shown in FIG. 29. When the movable platen 15 is withdrawn in this state, the stationary cavity unit 1 is connected with the removable cavity unit 2 in the state in which the parting line surfaces (PL surface shown in FIG. 28) are in contact with each other, so that the stationary cavity unit 1 and the removable cavity unit 2 are moved as an integral body so as to be separated from the fixed matrix 4.

After the mold is opened until the guide pins 7 are released from the mounting plate 9, the actuator 16 is driven so as to slide the sliding plate 13 until the other pair of cavity units reaches the position where the nozzle 40 communicates with the cavity 29. By the sliding operation of the sliding plate 13, the pair of cavity units which has finished the injection process leaves the injection position for the cooling position. In the cooling process, since the guide pins 6 for maintaining the mold-clamping force are engaged with the locking member 11 and the stationary cavity unit is in close contact with the removable cavity unit 2, these cavity units provide self-maintenance of the mold-clamping force. Consequently, good injection molding free from shrinkage or deformation is enabled even if the product is thick-walled. In the mold-clamping force self-maintaining state, even if the inner pressure of a resin acts in the direction of extension of the guide pin 6, the parting line surfaces are not open by virtue of the urging force of the spring 25. In other words, even if the member for maintaining the mold-clamping force is small, self-maintenance of the mold-clamping force is ensured. This embodiment is advantageous in that it is possible to provide the guide pins 6 for maintaining the mold-clamping force at the portions to which the inner pressure of a resin is applied, so that a more compact mold device is realized.

After the steps of mold clamping, injection and engagement of the guide pins 6 with the locking member 11 of the other pair of cavity units, the mold is opened. The actuator 16 is then driven so as to slide back the sliding plate 13 until the first pair of cavity units in the cooling process reaches the position where the nozzle 40 communicates with the cavity 29.

Thereafter, the movable platen 15 is advanced toward the removable cavity unit 2, and the actuator 8 is driven in this state, so that the locking member 11 is moved back by the distance C in the direction opposite to the direction indicated by the arrow S. By this operation, the engagement of the guide pins 6 with the locking member 11 is released and the guide pins 7 are engaged with the locking member 11, as shown in FIG. 31. Therefore, the removable cavity unit 2 is engaged with the fixed matrix 4. Consequently, when the movable platen 15 is withdrawn, the parting line surfaces are open and the molded product is taken out, as shown in FIG. 30. After the steps of mold closing and injection, the guide pins 6 are again engaged with the locking member 11 by the actuator 8, and the mold is opened. By the same operation as in the first pair of cavity unit, the molded product is taken out of the second cavity unit. By repeating these steps, continuous injection molding is conducted. According to this embodiment, since it is possible to link the driving operation of the actuator 8 with the mold clamping and mold opening operations, the self-maintenance and the release of the mold-clamping force can be automatized, thereby shortening the molding cycle time. In addition, since the self-maintenance and the release of the mold-clamping force and the attachment and the removal of the removable cavity unit 2 to and from the fixed matrix 4 are simultaneously conducted by a single operation, there is no error in the operation, so that it is possible to prevent the breakage of the mold caused by such an error.

Figure 33:
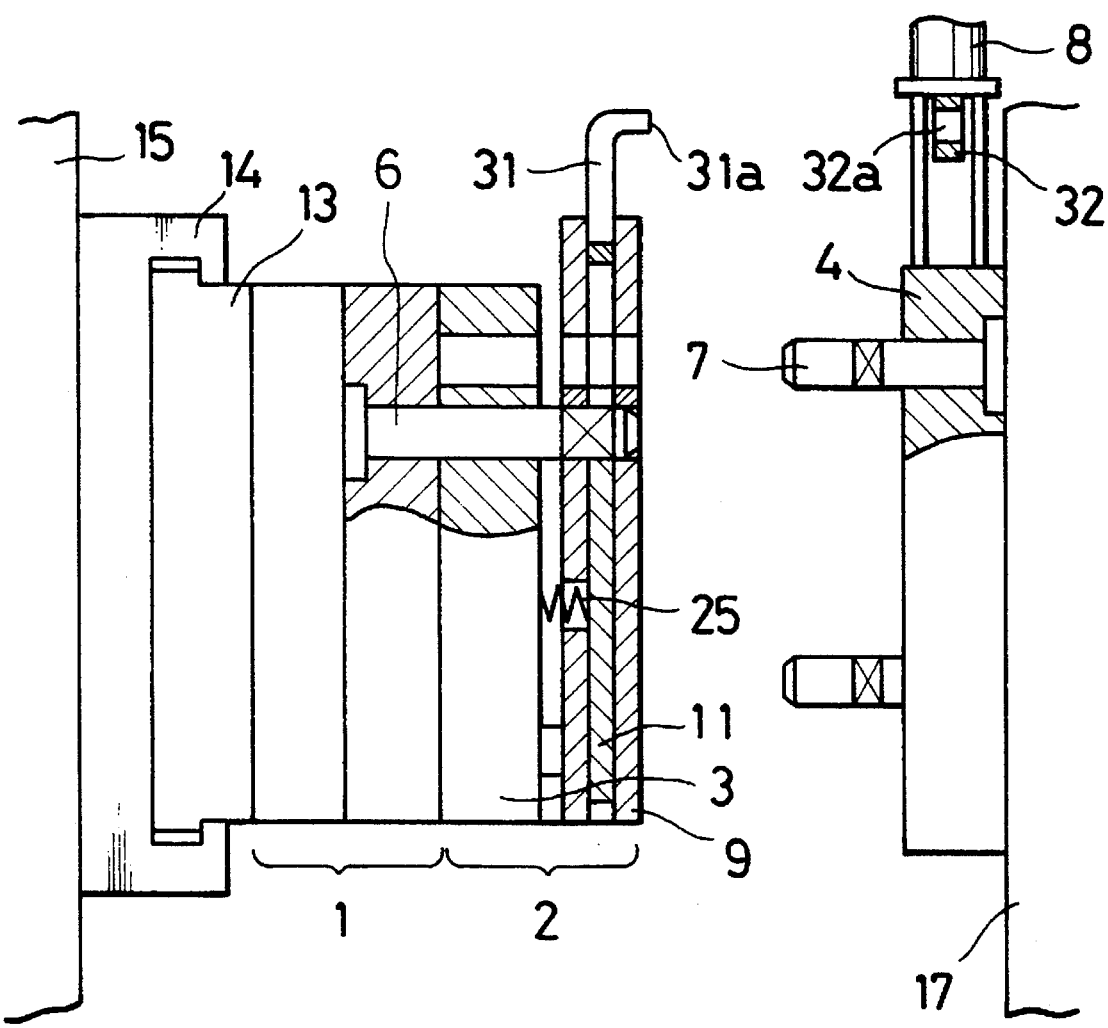
FIG. 33 is a bottom view of a fifth embodiment of the present invention.
Figure 34:
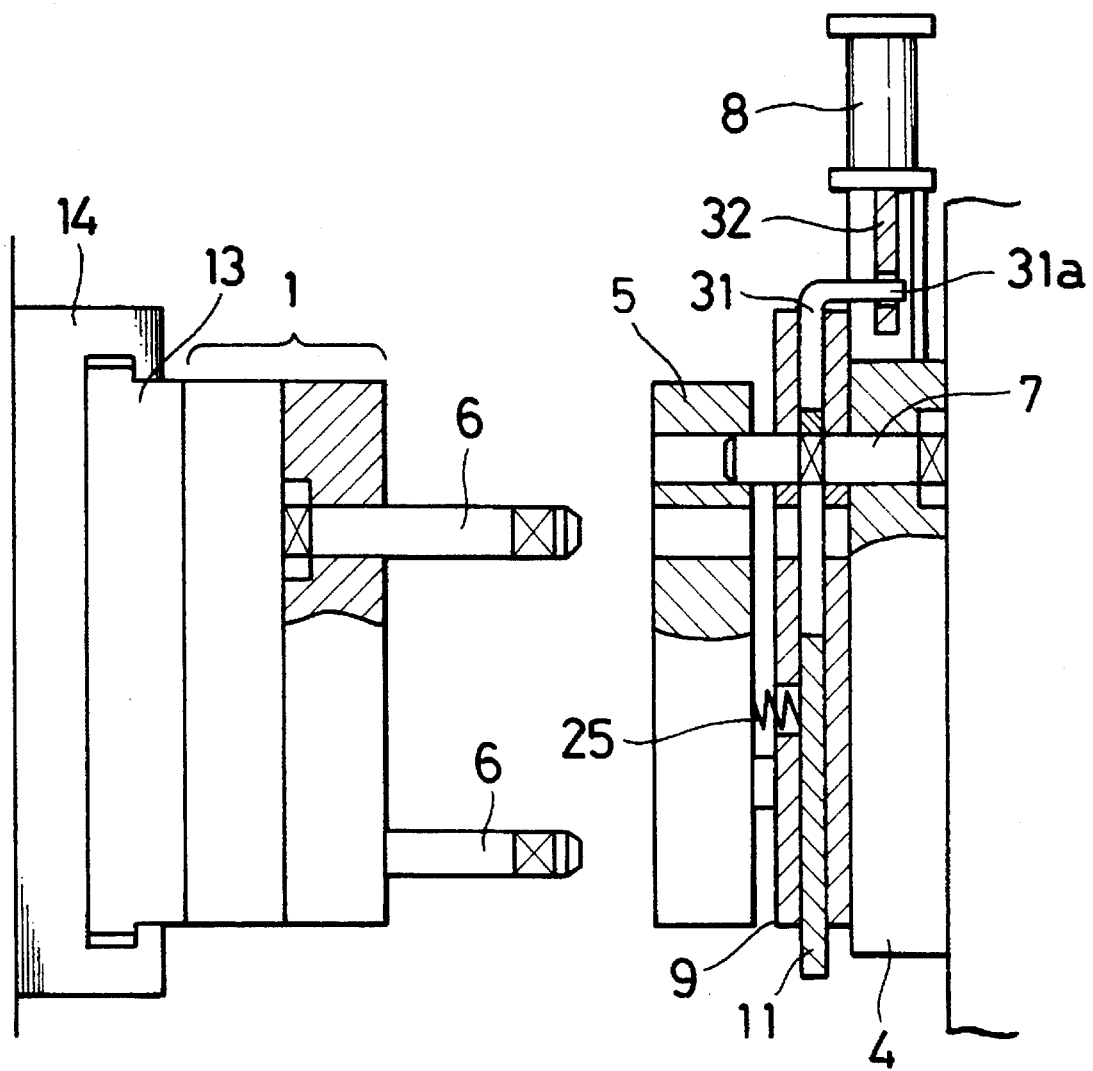
FIG. 34 is a bottom view of a part of the fifth embodiment, showing the operation thereof.

FIGS. 33 and 34 show a fifth embodiment of the present invention. The same numerals are provided for the elements which are the same as those in the fourth embodiment. In this embodiment, a connecting rod 31 which extends in the direction S (shown in FIG. 29) is attached to the end surface of the locking member 11 which is inserted into the mounting plate 9 in such a manner as to reciprocate. The actuator 8 for reciprocating the locking member 11 is attached to the fixed matrix 4. The connecting rod 31 has a connecting portion 31a which is bent toward the fixed matrix 4.

The actuator 8 is provided with an outputting rod 32. A hole 32a, into which the connecting portion 31a of the connecting rod 31 is removably inserted, is provided in the outputting rod 32.

In this structure, the connecting portion 31a enters the hole 32a and the locking member 11 is connected to the actuator 8 through the connecting rod 31 with the advance of the movable platen 15 in the direction of mold clamping, as shown in FIG. 34. Consequently, since the single actuator 8 copes with a plurality of cavity units so as to operate the self-maintenance and the release of the mold-clamping force in this embodiment, the number of parts is reduced, the structure and the assembly of the injection mold device is made simpler, and the control thereof is facilitated.

Figure 35:
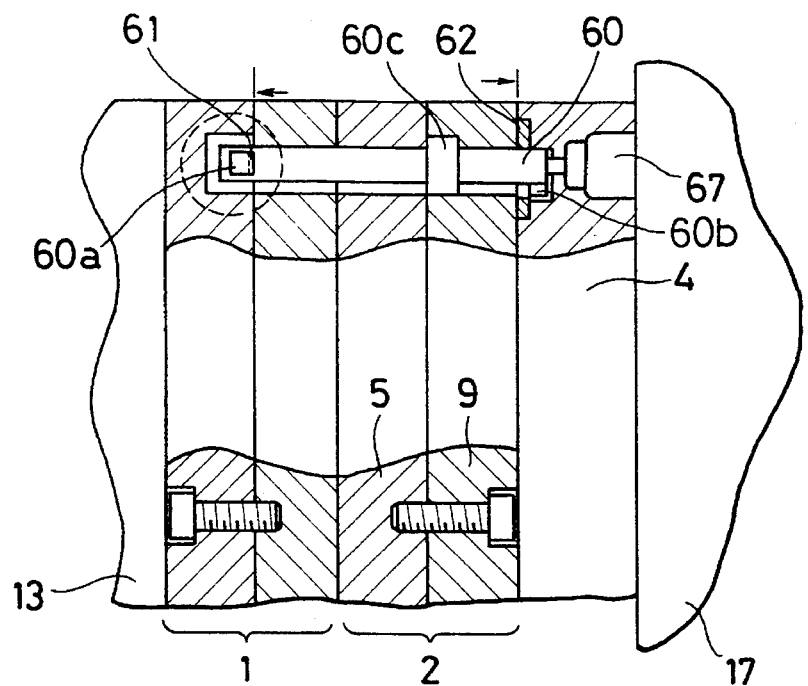
FIG. 35 is a side elevational view of a sixth embodiment of the present invention.
Figure 36:
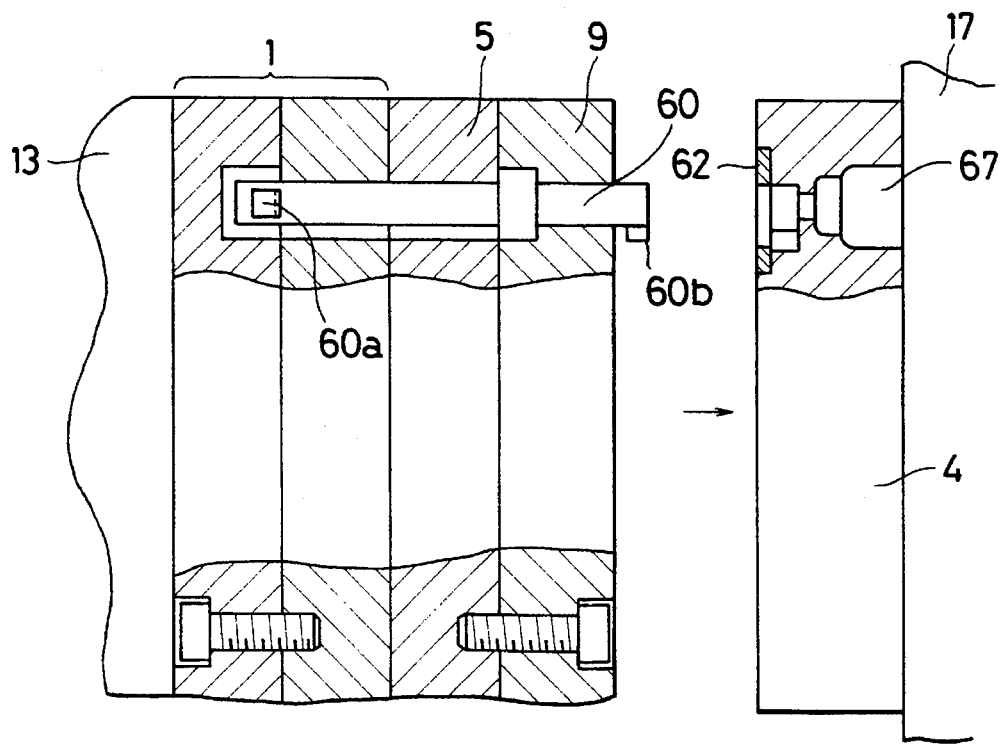
FIG. 36 is a side elevational view of the sixth embodiment shown in FIG. 35 in the mold-opened state.
Figure 37:
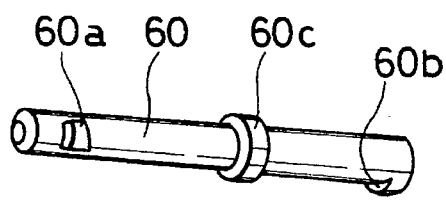
FIG. 37 is a perspective view of the holding rod of the sixth embodiment.
Figure 38:
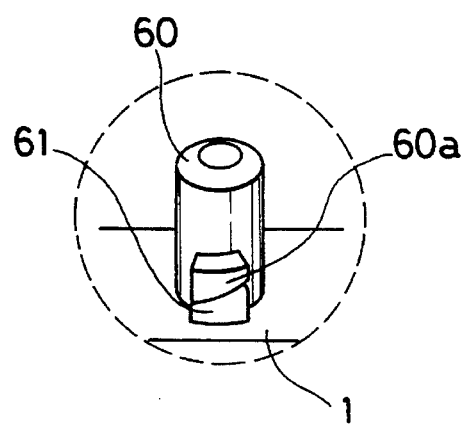
FIG. 38 is a perspective view of the holding rod shown in FIG. 37 in the engaged state.

FIGS. 35 to 41 show a sixth embodiment of the present invention. In this embodiment, a holding rod 60 penetrates through the stationary cavity unit 1, which is attached to the sliding plate 13, and the removable cavity unit 2, which is composed of the template 5 and the mounting plate 9. The holding rod 60 is provided with a collar portion 60c having a large diameter in the vicinity of the central portion thereof. When the collar portion 60c is clamped between the template 5 and the mounting plate 9, the holding rod 60 penetrates through the stationary cavity unit 1 and the removable cavity unit 2 in the direction of mold clamping. The holding rod 60 is rotatably mounted. The stationary cavity unit 1, as shown in FIGS. 35 and 36, has a retaining member 61 with which a retaining piece 60a of the holding rod 60 releasably engages and is provided at the corresponding portion of the stationary cavity unit 1. FIG. 38 shows the retaining piece 60a and the retaining member 61 in the engaged state. The engaging surfaces of the retaining piece 60a and the retaining member 61 are tapered. When the holding rod 60 rotates such that the tapered surfaces engage with each other, the retaining piece 60a engage with the retaining member 61, while by the opposite rotation of the holding rod 60, the engagement is released. The engagement of the retaining piece 60a with the retaining member 61 maintains the mold-clamping force of a pair of cavity units, as shown in FIG. 36.

The retaining piece 60b at the other end of the holding rod 60 is removably inserted into the fixed matrix 4. A retaining member 62 with which the retaining piece 60b removably engages is provided within the fixed matrix 4. By this engagement, the removable cavity unit 2 engages the fixed matrix 4. The engagement of the retaining piece 60b with the retaining member 62 is conducted by the rotation of the holding rod 60. In order to avoid the simultaneous engagement of the retaining piece 60a with the retaining member 61 and the engagement of the retaining piece 60b and with retaining member 62, the positions of the retaining pieces 60a and 60b are shifted from each other at 90 degrees.

Figure 39:
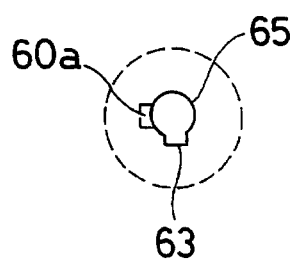
FIG. 39 shows an end surface of a stationary cavity unit of the sixth embodiment.
Figure 40:
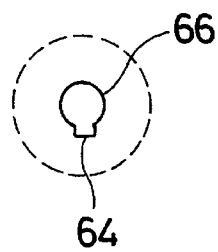
FIG. 40 shows an end surface of the fixed matrix of the sixth embodiment.

FIG. 39 shows the end surface of the stationary cavity unit 1 in the vicinity of the retaining piece 60a. An insertion hole 65 for inserting the holding rod 60 therethrough is formed both in the stationary cavity unit 1 and in the removable cavity unit 2. A clearance groove 63 through which the retaining piece 60a of the holding rod 60 passes is provided at a part of the insertion hole 65. FIG. 40 shows the end surface of the fixed matrix 4 on the retaining piece 60b side. An insertion hole 66 for the holding rod 60 and a clearance groove 64 through which the holding rod 60 passes are provided in the end surface of the fixed matrix 4.

Figure 41:
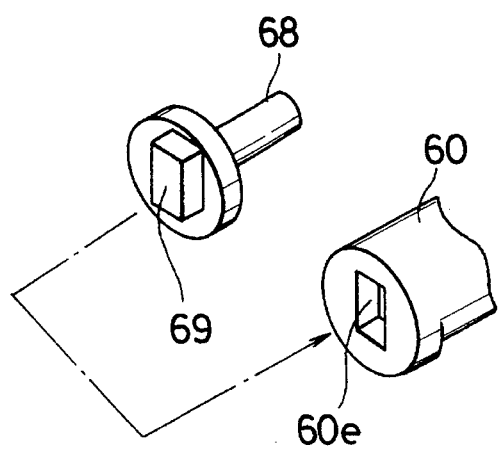
FIG. 41 is a perspective view of an end portion of the holding rod shown in FIG. 37.

The holding rod 60 is rotated by driving a motor 67 provided in the fixed matrix 4. FIG. 41 shows the relationship between the motor 67 and the holding rod 60. A connecting projection 69 is provided on the motor shaft 68 of the motor 67. At the base end of the holding rod 60, a connecting recess 60e for receiving the connecting projection 69 is provided, so that when the motor 67 is driven, the holding rod 60 rotates.

According to this embodiment, change-over between the self-maintenance of the mold-clamping force and the mold opening operation is conducted by the rotation of the motor 67. That is, when the retaining piece 60a of the holding rod 60 is engaged with the retaining member 61 by the motor 67, the engagement of the retaining piece 60b with the retaining member 62 is released. Thus the holding rod 60 is removed from the fixed matrix 4, as shown in FIG. 36, and the mold-clamping force of the cavity units is maintained. On the other hand, when the retaining piece 60b of the holding rod 60 is engaged with the retaining member 62 by the motor 67, the engagement of the retaining piece 60a with retaining member 61 is released, so that the holding rod 60 is removed from the stationary cavity unit 1, and the pair of cavity units is opened.

Figure 42:
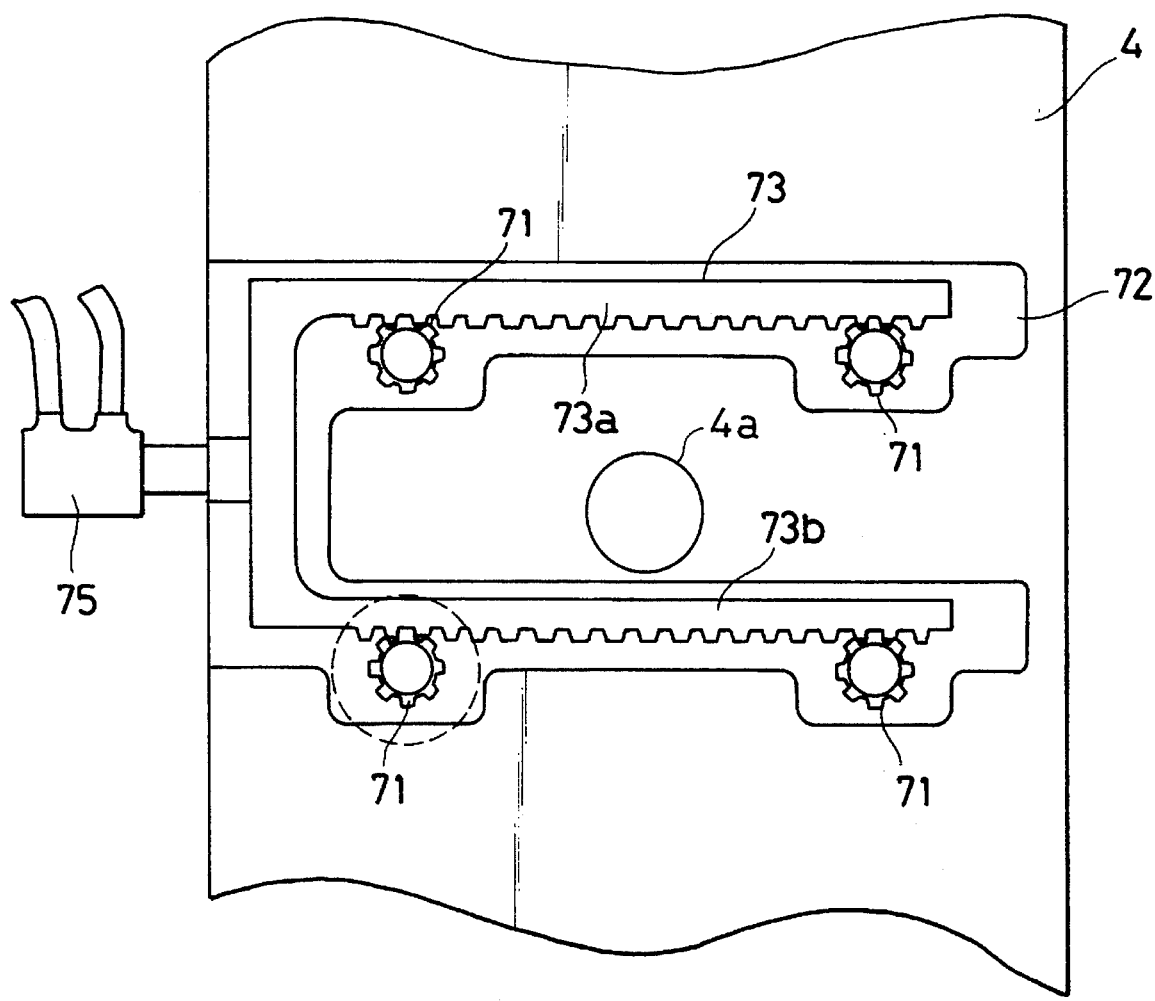
FIG. 42 is an elevational view of a modification of the sixth embodiment.
Figure 43:
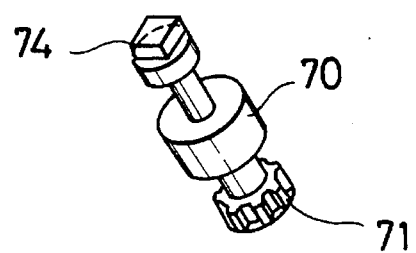
FIG. 43 is a perspective view of a part of the modification shown in FIG. 42.

FIGS. 42 and 43 show a modification of the sixth embodiment. In this embodiment, a plurality of (four in FIG. 42) holding rods 60 are provided within the fixed matrix 4. In FIG. 42, the reference numeral 70 represents a rotary shaft which rotates in the same axial direction as each holding rod 60. A pinion 71 is attached to the end portion of the rotary shaft 70, as shown in FIG. 42. A U-shaped projection 74 fitting into the connecting recess 60e of the holding rod 60 is provided at the opposite end of the rotary shaft 70. Therefore, when the pinion 71 rotates, each holing rod 60 rotates. The rack member 73 drives the pinion 71 by reciprocation thereof. To one end of the rack member 73 is connected a fluid cylinder 75, such as a hydraulic cylinder, and an air cylinder for reciprocating the racking member 73.

According to this structure embodiment, the racking member 73 reciprocates when the cylinder 75 is driven, thereby rotating all the pinions 71 and, hence, the holding rods 60. It is therefore possible to rotate all the holding rods 60 by the single driving source, simplying the driving system and facilitating the control and the maintenance thereof is.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An injection mold device comprising: a first matrix attached to a movable platen; a plurality of first cavity units attached to the first matrix; a second matrix attached to a stationary platen; a plurality of second cavity units selectively removably attachable to the first matrix during a mold-clamping state and to the second matrix during a mold-opening state; self-holding means associated with the first matrix for maintaining a clamping force between respective pairs of first and second cavity units during the mold-clamping state; and mold-opening means associated with the second matrix for removably attaching the respective pairs of first and second cavity units to one another in the mold-clamping state and for removing the second cavity units from the first matrix in the mold-opening state.

2. An injection mold device according to claim 1; further comprising moving means associated with the first matrix for moving the first matrix towards the second matrix for selective removable attachment of the second cavity units to the first matrix during the mold-clamping state and to the second matrix during the mold-opening state.

3. An injection mold device according to claim 2; further comprising switching means provided on one of the first matrix and the second matrix for selectively operating the self-holding means and the mold-opening means.

4. An injection mold device according to claim 3; wherein the self-holding means comprises a hooking member attached to each of the first cavity units, and a locking member attached to and relatively movable with respect to each of the second cavity units for selective engagement with and disengagement from the hooking member of each of the first cavity units; and wherein the mold-opening means comprises a hooking member attached to the second matrix; whereby the locking member is selectively moved by the switching means into engagement with the hooking member of each of the first cavity units during the mold-clamping state and into engagement with the hooking member of the second matrix during the mold-opening state.

5. An injection mold device according to claim 3; wherein the switching means comprises an actuator for moving the locking member in a direction perpendicular to the direction of movement of the moving means.

6. An injection mold device according to claim 1; wherein the first matrix comprises means for selectively moving the first cavity units and the second cavity units between an injection position and a cooling position.

7. An injection mold device according to claim 1; wherein the self-holding means comprises a hooking member provided on each of the first cavity units, and a movable locking member provided on each of the second cavity units for selective engagement with and release from the hooking member.

8. An injection mold device according to claim 1; wherein the mold-opening means comprises a hooking member provided on the second matrix; and a movable locking member provided on each of the second cavity units for selective engagement with and release from the hooking member.

9. An injection mold device according to claim 1; wherein each of the second cavity units comprises a stationary face mold defining a cavity in combination with a respective one of the first cavity units, a stationary mounting plate movably supporting the stationary face mold, urging means provided between the stationary face mold and the stationary mounting plate for urging the stationary face mold to a respective one of the first cavity units, and stopper means for regulating a movement amount of the stationary face mold with respect to the stationary mounting plate by the urging means.

10. An injection mold device according to claim 9; wherein the urging means comprises an elastic member.

11. An injection mold device according to claim 9; wherein the stopper means comprises a stopper pin.

12. An injection mold device according to claim 9; wherein the stationary mounting plate is provided with a locking member for movement in a direction perpendicular to a mold-clamping direction for clamping respective pairs of the first and second cavity units.

13. An injection mold device comprising: a first matrix attached to a movable platen; a plurality of first cavity units attached to the first matrix; a second matrix attached to a stationary platen; a plurality of second cavity units selectively removably attachable to the first matrix during a mold-clamping state and to the second matrix during a mold-opening state; a self-holding member provided on each of the first cavity units for maintaining a clamping force between respective pairs of first and second cavity units during the mold-clamping state; a mold-opening member provided on the second matrix for removably attaching the second cavity units to the first matrix in the mold-clamping state; and a locking member attached to and relatively movable with respect to each of the second cavity units for selective engagement with the self-holding member during the mold-clamping state and with the mold-opening member during the mold-opening state.

14. An injection mold device according to claim 13; wherein the first matrix comprises a sliding plate slidable in a direction parallel to the movable platen, the plurality of first cavity units being attached to the sliding plate; and an actuator for moving the sliding plate.

15. An injection mold device according to claim 13; wherein each of the second cavity units includes an elastic member for urging each of the first cavity units into engagement with a respective one of the second cavity units when the locking member is in engagement with the self-holding member.

16. An injection mold device according to claim 13; wherein each of the second cavity units comprises a stationary face mold defining a cavity in combination with a respective one of the first cavity units, a stationary mounting plate movably supporting the stationary face mold, urging means provided between the stationary face mold and the stationary mounting plate for urging the stationary face mold to a respective one of the first cavity units, and stopper means for regulating a movement amount of the stationary face mold with respect to the stationary mounting plate by the urging means.

17. An injection mold device according to claim 16; wherein the urging means comprises a spring.

18. An injection mold device according to claim 16; wherein the stopper means comprises a stopper pin.

19. An injection mold device according to claim 16; wherein the stationary mounting plate is provided at a central portion thereof with a through passage for receiving the locking member.

20. An injection mold device comprising: a first matrix having at least one first cavity unit attached thereto; a second matrix having at least one second cavity unit removably attached thereto; first means for moving the first cavity unit in a first direction into engagement with the second cavity unit to define a mold-clamping state; a movable locking member provided on the second cavity unit; self-holding means associated with first cavity unit for engagement with the locking member to maintain the first cavity unit and the second cavity unit in the mold-clamping state; and means associated with the second matrix for removably attaching the first cavity unit and the second cavity unit in the mold-clamping state.

21. An injection mold device according to claim 20; wherein the second cavity unit comprises a stationary face mold defining a cavity in combination with the first cavity unit, a stationary mounting plate movably supporting the stationary face mold, and urging means provided between the stationary face mold and the stationary mounting plate for urging the stationary face mold toward the first cavity unit.

22. An injection mold device according to claim 21; wherein the stationary mounting plate comprises a stopper pin supporting the stationary face mold for controlling a movement amount of the stationary face mold by the urging means.

23. An injection mold device according to claim 20; wherein the first matrix comprises a sliding plate aligned with the first cavity unit, a movable mounting plate slidably receiving the sliding, plate and an actuator for sliding the sliding plate.

24. An injection mold device according to claim 20; wherein the second matrix comprises an actuator for moving the movable locking member.

25. An injection mold device according to claim 20; wherein the actuator comprises a rod having a connecting pin, and wherein the locking member comprises a connection hole for receiving the connecting pin.

26. An injection mold device according to claim 20; wherein the self-holding means comprises a plurality of hook elements bent inwardly, and a slit between each pair of the hook elements; and wherein the means associated with the second matrix comprises a plurality of hook elements bent inwardly, and a slit between each pair of the hook elements.

27. An injection mold device according to claim 20; wherein the self-holding means comprises a self-holding guide pin having D-shaped cut portions, and wherein the mold-opening means comprises a mold-opening guide pin having D-shaped cut portions.

28. An injection mold device according to claim 20; wherein the first matrix is attached to a movable platen and the second matrix is attached to a stationary platen.

29. An injection mold device comprising: a first matrix; a plurality of first cavity units attached to the first matrix, each cavity unit having a retaining member; a second matrix; a plurality of second cavity units selectively removably attached to the first matrix during a mold-clamping state and to the second matrix during a mold-opening state, each of the second cavity units having a retaining member; means for selectively moving respective pairs of first and second cavity units between an injection position and a cooling position; a plurality of rotating members each rotatably held in a respective one of the second cavity units, each rotating member having retaining portions for respective and selective engagement with the retaining member of a respective first cavity unit and the retaining member of a respective second cavity unit; and means for rotating the rotating members.

30. An injection mold device according to claim 29; further comprising moving means associated with the first matrix for moving the first matrix towards the second matrix for selective removable attachment of a respective second cavity unit to the first matrix in the mold-clamping state and to the second matrix in the mold-opening state, wherein the retaining portions of the rotating member are in respective and selective engagement with the retaining member of a respective first cavity unit in the mold-clamping state and with the engaging member of a respective second cavity unit in the mold-opening state.

* * * * *